United States Patent
Shaffer et al.

(10) Patent No.: US 7,031,268 B1
(45) Date of Patent: *Apr. 18, 2006

(54) CALL OPTIMIZATION IN AD-HOC CONFERENCE CALLS

(75) Inventors: Shmuel Shaffer, Palo Alto, CA (US); Charles J. Bedard, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 980 days.

This patent is subject to a terminal disclaimer.

(21) Appl. No.: 09/741,696

(22) Filed: Dec. 19, 2000

Related U.S. Application Data

(63) Continuation-in-part of application No. 09/572,199, filed on May 17, 2000.

(51) Int. Cl.
*H04Q 11/00* (2006.01)

(52) U.S. Cl. .................... 370/260; 709/204
(58) Field of Classification Search ........ 370/260–262, 370/331, 352, 281, 480, 264–268, 270, 397; 455/404.1, 416, 427, 520, 521, 560, 397; 709/204–209, 241
See application file for complete search history.

(56) References Cited

U.S. PATENT DOCUMENTS

| 5,483,588 | A | 1/1996 | Eaton et al. ........... 379/202.01 |
| 5,970,126 | A | 10/1999 | Bowater et al. ............ 379/114 |
| 6,212,268 | B1 | 4/2001 | Nielsen ................. 379/210.01 |
| 6,272,214 | B1 | 8/2001 | Jonsson ................. 379/202.01 |
| 6,501,740 | B1 | 12/2002 | Sun et al. .............. 379/202.01 |
| 6,694,351 | B1 * | 2/2004 | Shaffer et al. .............. 709/204 |

OTHER PUBLICATIONS

Gralla, Preston, *How the Internet Works*, p. 114-115 (Millennium Edition 1999).

* cited by examiner

*Primary Examiner*—Chi Pham
*Assistant Examiner*—Prenell Jones
(74) *Attorney, Agent, or Firm*—Campbell Stephenson Ascolese LLP

(57) ABSTRACT

A method and system for adding a participant to a conference call. A feature of the method and system is that with respect to individual invitees to ad-hoc conference calls, the conference call can essentially be "turned around" and treated "as if" the individual invitees were dialing in to a "meet-me" conference call, if it is determined that such is the more optimum calling method. A multipoint controller unit, in conjunction with a Call Optimization Application (COA), utilizes information contained in one or more tokens to make possible the change in call direction. The optimal call direction is established via a COA channel.

88 Claims, 30 Drawing Sheets

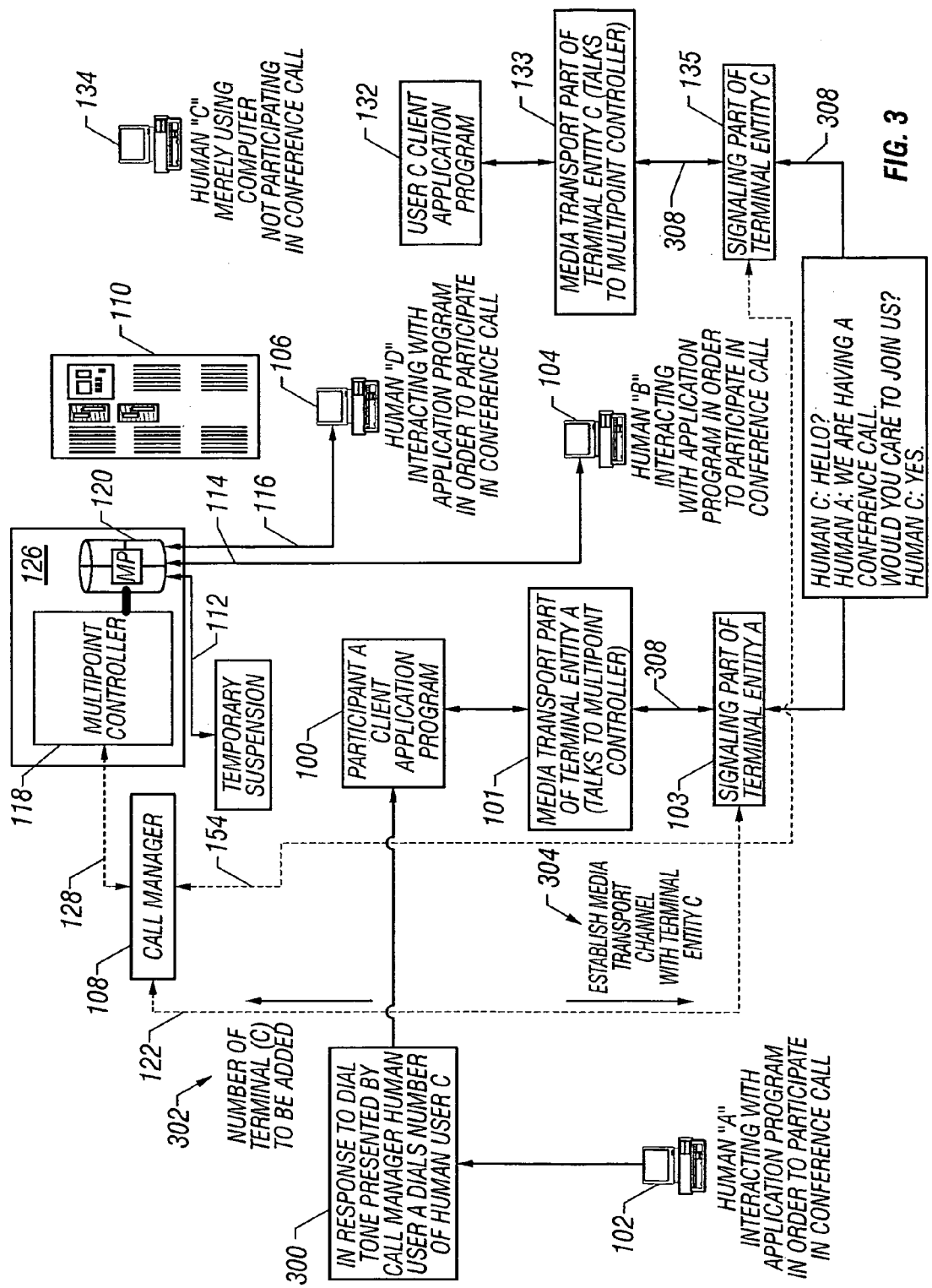

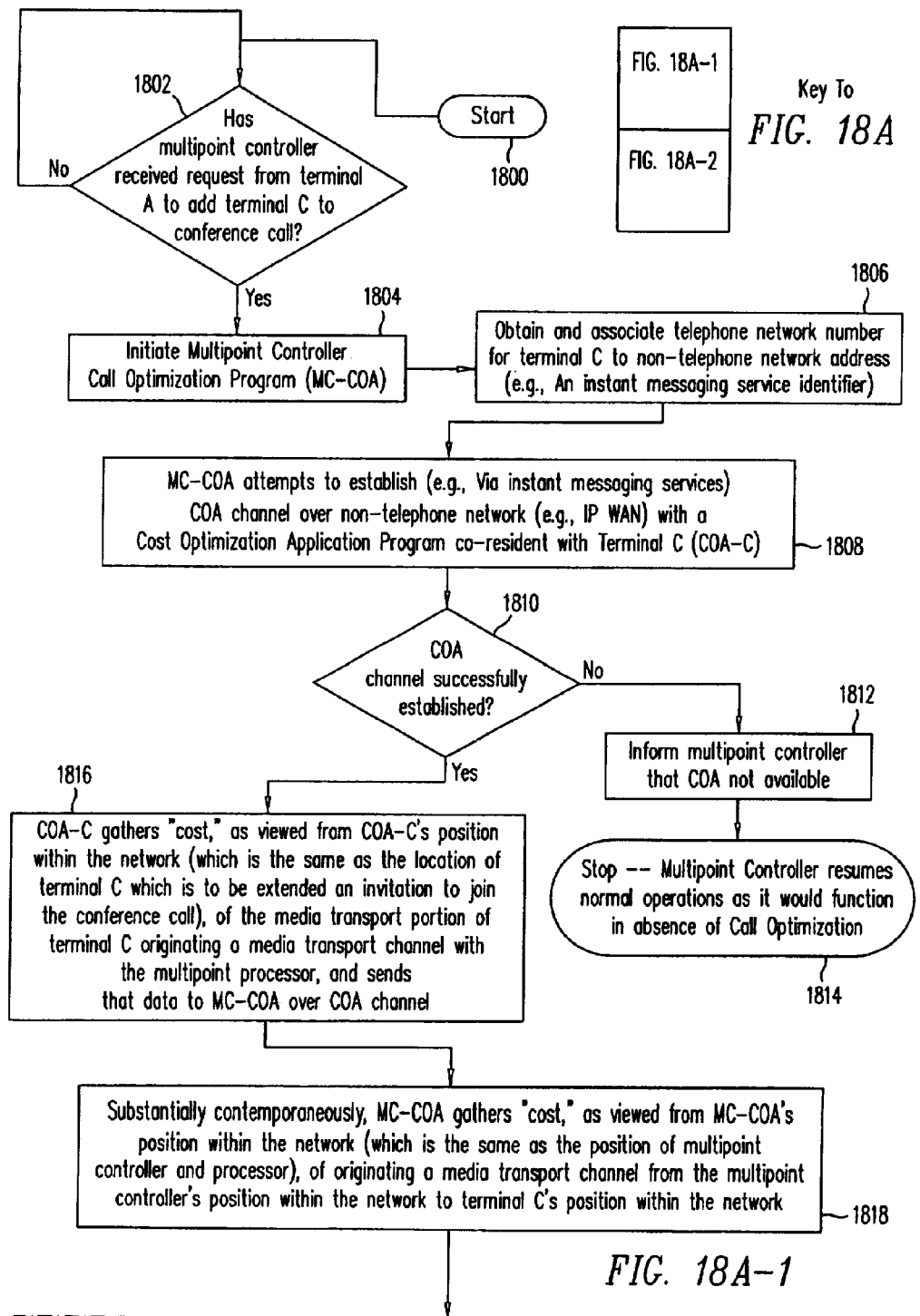

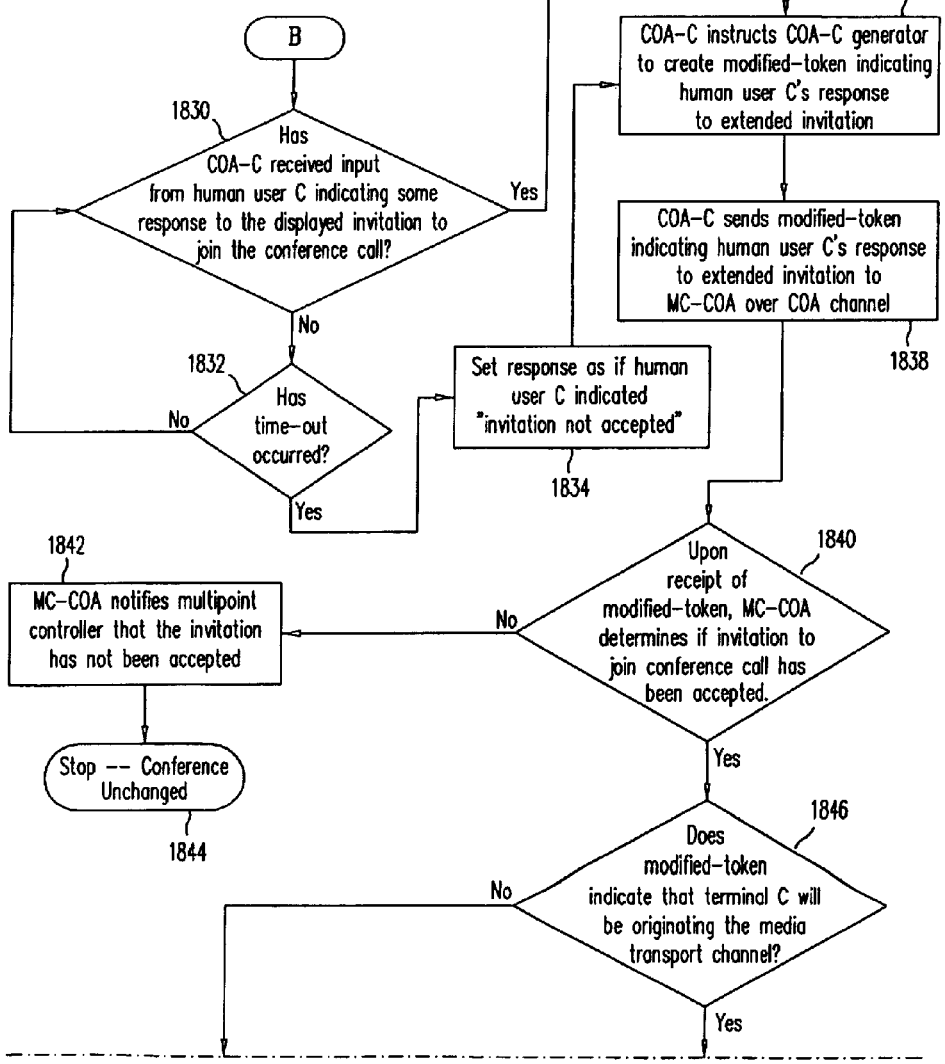

CALL OPTIMIZATION IN AD-HOC CONFERENCE CALLS

CROSS REFERENCE TO RELATED APPLICATIONS

The present invention is a continuation-in-part of application Ser. No. 09/572,199—entitled "Call Optimization in Ad-Hoc Conference Calls," filed 17 May 2000, naming Shmuel Shaffer and Charles J. Bedard as inventors—which is hereby incorporated by reference in its entirety.

BACKGROUND OF THE INVENTION

The present invention is related to a method and system to be utilized in at least one data communications network wherein conference calls are established.

DESCRIPTION OF THE RELATED ART

A data communications network is the interconnection of two or more communicating entities (i.e., data sources and/or sinks) over one or more data links. A data communications network allows communication between multiple communicating entities over one or more data communications links.

A data communications network can be used to support a conference call. With reference now to FIG. 1, shown is a data communications network in a conference call configuration. Depicted are three humans A, B, and D interacting with application programs on computers 102, 104, and 106 in order to participate in the conference call. The interaction with the application programs typically involves the utilization of microphones, speakers, keyboards, and/or graphical user interfaces on computers 102, 104, and 106. For example, when a user speaks into a microphone and listens to a speaker of a computer where an application program is resident and running. For sake of clarity, only conferenced-in computer 102 is explicitly shown as having application programs 100, 101, and 103 but it is to be understood that similar application programs are present on computers 104 and 106, although such additional application programs are not shown.

For sake of illustration, the discussion herein depicts and describes logical entities as if they are application programs running on computers. For example, multipoint controller 118 and multipoint processor 120 are depicted and described as if they were subprograms of conferencing engine 126 which is itself depicted and described as a program resident within and running on network computer 110; participant A client application program 100, media transport part 101 of terminal entity A, and signaling part 103 of terminal entity A are depicted and described as if they are programs resident within and running on computer 102; and user C client application program 132, media transport part 133 of terminal entity C, and signaling part 135 of terminal entity C are depicted and described as if they are programs resident within and running on computer 134. However, those skilled in the art will appreciate that such treatment is merely illustrative and that the logical entities depicted and described herein may be implemented as hardware or any combination of hardware and software (e.g., in one implementation multipoint processor 120 is actually a stand-alone processor).

Illustrated is that media (e.g., audio or visual data presented to human users A, B, and D through their respective applications programs) exchanged between the application programs of conference call participants A, B, and D are carried by media transport channels 112, 114, and 116. As used herein, media transport channels refer to channels sufficient to meet defined data transmission needs for individual conference calls. Those skilled in the art will recognize that the definition of such data transmission needs can be pre-set by a particular data communications system, or can be set and/or reset by one or more conference call participants at call initiation and/or during a conference call. In any event, as used herein the term "media transport channels" refers to data communications channels sufficient to substantially meet such user media transmission requirements.

Media transport channels 112, 114, and 116 respectively connect individual media transport parts of terminal entities resident on computers 102, 104, and 106 to multipoint processor 120. However, for sake of clarity only media transport part 101 of terminal entity A of computer 102 is shown, but it is to be understood that similar media transport parts are present on computers 104 and 106, although such media transport parts are not shown. Multipoint processor 120 is a conferencing engine 126 component that ensures that data is appropriately mixed and sent to various participants engaging in the conference call (e.g., data received over media transport channel 112 is mixed and sent out over media transport channels 114 and 116).

The establishment of media transport channels such as media transport channels 112, 114, and 116 is managed by call manager 108. Call manager 108 establishes and tears down media transport channels in response to call management signals sent to call manager 108 by multipoint controller 118, and signaling parts of terminal entities located within computers 102, 104, and 106. For ease of illustration, only one signaling part of a terminal entity (i.e., signaling part 103 of terminal entity A resident within computer 102) is shown, but it is to be understood that similar signaling parts are present on computers 104 and 106, although such signaling parts are not shown.

Referring now to FIG. 2, depicted is event 200 showing input from human user A to application program 100 (e.g., human user A punching a "conference call" button on a voice terminal or human user A clicking a conference call icon on a graphical user interface) requesting that a user (e.g., user C) be added to the ongoing conference call between call participant A, call participant B, and call participant D. Illustrated is that, in response to event 200, application program 100 causes signaling part 103 of terminal entity A to send a call management message 202 over call management channel 122 (as used herein, "call management channels" equate to "signaling channels" and such terms may be considered essentially interchangeable) informing call manager 108 of the request to extend an invitation to the conference call.

Shown is that, in response to message 202, call manager 108 sends message 204 to multipoint controller 118 wherein call manager 108 informs multipoint controller 118 that call manager 108 has received a request from terminal entity A to extend an invitation to join the conference call to a non-participating party, and asks multipoint controller 118 for instructions. Depicted is that, in response to message 204, multipoint controller 118 sends call manager 108 instructions that call manager is to (1) place the multipoint processor connection for terminal entity A in temporary suspension (as used "in temporary suspension" means that the multipoint processor connection for terminal entity A is temporarily suspended while other conference call participants (e.g., human B and human D) are allowed continue to engage in normal conference call activities), (2) provide terminal entity A with dial tone, and (3) allow human user A to dial the number of a terminal associated with a human user whom human user A desires to invite to join the conference call.

With reference now to FIG. 3, illustrated is that call manager 108, in response to the direction of multipoint controller 118, has placed media transport channel 112 in temporary suspension. Shown is event 300 wherein, in response to dial tone presented by call manager 108, human user A inputs (e.g., by a numeric keypad of computer 102) the telephone number, of the terminal associated with human user C, into application program 100. In response, application program 100 causes signaling part 103 of terminal entity A to send message 302 to call manager 108 wherein call manager 108 is informed of the telephone number of terminal entity C. In response, call manager 108 sends (a) message 304, over call management signaling channel 122 to signaling part 103 of terminal entity A directing that a media transport channel be established with terminal entity C.

Depicted is that, in response to message 304 media transport channel 308 is established. Subsequent to the establishment of media transport channel 308, illustrated is human C answering (e.g., via human speech after picking up a telephone handset) "hello." In response, shown is that human user A extends an oral invitation to join the conference call. Illustrated is that human C orally accepts the invitation.

Referring now to FIG. 4, shown is event 400 wherein is depicted that in response to human user C's oral acceptance of human user A's oral invitation to join the conference call, human user A enters input (e.g., via depressing an "add to conference button" on a graphical user interface, or on a physical telephone terminal) directing that terminal entity C be added to the conference call. Illustrated is that in response to event 400, signaling part 103 of terminal entity A sends message 402 to call manager 108 asking to transfer the terminal with which terminal entity A is currently connected (i.e., terminal entity C) to the conference call. In response to message 402, shown is that call manager 108 sends message 404 to multipoint controller 118 telling multipoint controller 118 that a request to add terminal entity C to the conference call has been received from terminal entity A. In response to message 404, shown is that multipoint controller 118 directs 406 call manager 108 to take the multipoint controller connection for terminal entity A off temporary suspension (i.e., reactivate media transport channel 112) and to establish a media transport channel between a given port of multipoint processor 120 and media transport part 133 of terminal entity C.

In response to direction 406, call manager substantially simultaneously (a) sends, via call management channel 122, message 408 directing signaling part 103 of terminal entity A to tear down media transport channel 308 and accept connection with media transport channel 112 (which has been in temporary suspension), and (b) sends, via call management channel 154, message 410 directing signaling part 135 of terminal entity C to tear down media transport channel 308.

With reference now to FIG. 5, depicted is that call manager 108 directs 500 multipoint controller 118 to originate a media transport channel with media transport part 133 of terminal entity C. Consequently, in response to direction 500, shown is that media transport channel 144 is established. Also shown is that media transport channel 112 has been reestablished.

Those having skill in the art will recognize that significant "cost" (as used herein, the term "cost" can reflect network efficiency costs, monetary costs, reliability costs, or any combination of the foregoing) is associated with establishing and maintaining media transport channels. It has been discovered by the inventors named herein ("inventors"), and such discovery forms part of the inventive content of this patent application, that a method and system can be devised that will substantially optimize calling by decreasing the costs associated with conference calls by decreasing the number of media transport channels that must be set up and torn down in order to establish a conference call and by allowing the direction of call origination when adding participants to conference calls to be done in a substantially optimum fashion. How embodiments achieve the foregoing will become apparent in the detailed description, below.

SUMMARY OF THE INVENTION

The inventors have devised a method and system which, among other things, can be utilized to allow substantial optimization of call direction and network connections in ad-hoc mode conference calls.

A method and system for adding a participant to a conference call is described. In one embodiment a method can include but is not limited to the following: in response to a multipoint controller receiving a request to extend an invitation to an ongoing conference call to a first terminal, establishing a Call Optimization Application (COA) channel between a Multipoint Controller-Call Optimization Application (MC-COA) and a Call Optimization Application co-resident with the first terminal (Terminal-COA), said establishing a COA channel effected via instant messaging following an address resolution; exchanging cost information data between the Terminal-COA and the MC-COA; determining an optimal media transport channel origination strategy in response to the cost information data; sending the Terminal-COA an invitation to join the conference call, the invitation having associated information consonant with the optimal media transport channel origination strategy; receiving, with the MC-COA, a message from the Terminal-COA containing human user input received in response to the invitation to join; and responding to the message containing the human user input. In another embodiment, a system can include but is not limited to a computer program implementing the foregoing described method.

In another embodiment, a method for adding a participant to a conference call can include but is not limited to the following: in response to a multipoint controller receiving a request to extend an invitation to an ongoing conference call to a first terminal, attempting to establish, via instant messaging, a Call Optimization Application (COA) channel between a Multipoint Controller-Call Optimization Application (MC-COA) and a Call Optimization Application co-resident with the first terminal (Terminal-COA). In another embodiment, a system can include but is not limited to a computer program implementing the foregoing described method.

In another embodiment, a method for accepting an invitation to an ongoing conference call can include but is not limited to the following: receiving, with a Call Optimization Application co-resident with a first terminal (Terminal-COA), an invitation to the first terminal to join an ongoing conference call over a Call Optimization Application (COA) channel established via instant messaging; and responding to the invitation to join in response to human user input to an interface activated in response to the invitation. In another embodiment a system can include but is not limited to a computer program implementing the foregoing described method.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art, by referencing the accompanying drawings.

FIGS. 1–5 show related-art processes and devices for inviting and joining parties into conference calls.

FIGS. 18A and 18B depict a high-level logic flowchart of an embodiment of a method for inviting and joining parties into conference calls.

The use of the same reference symbols in different drawings indicates similar or identical items.

DETAILED DESCRIPTION

The following sets forth a detailed description of a mode for carrying out embodiments described. The description is intended to be illustrative of the invention and should not be taken to be limiting.

Figure 6A:
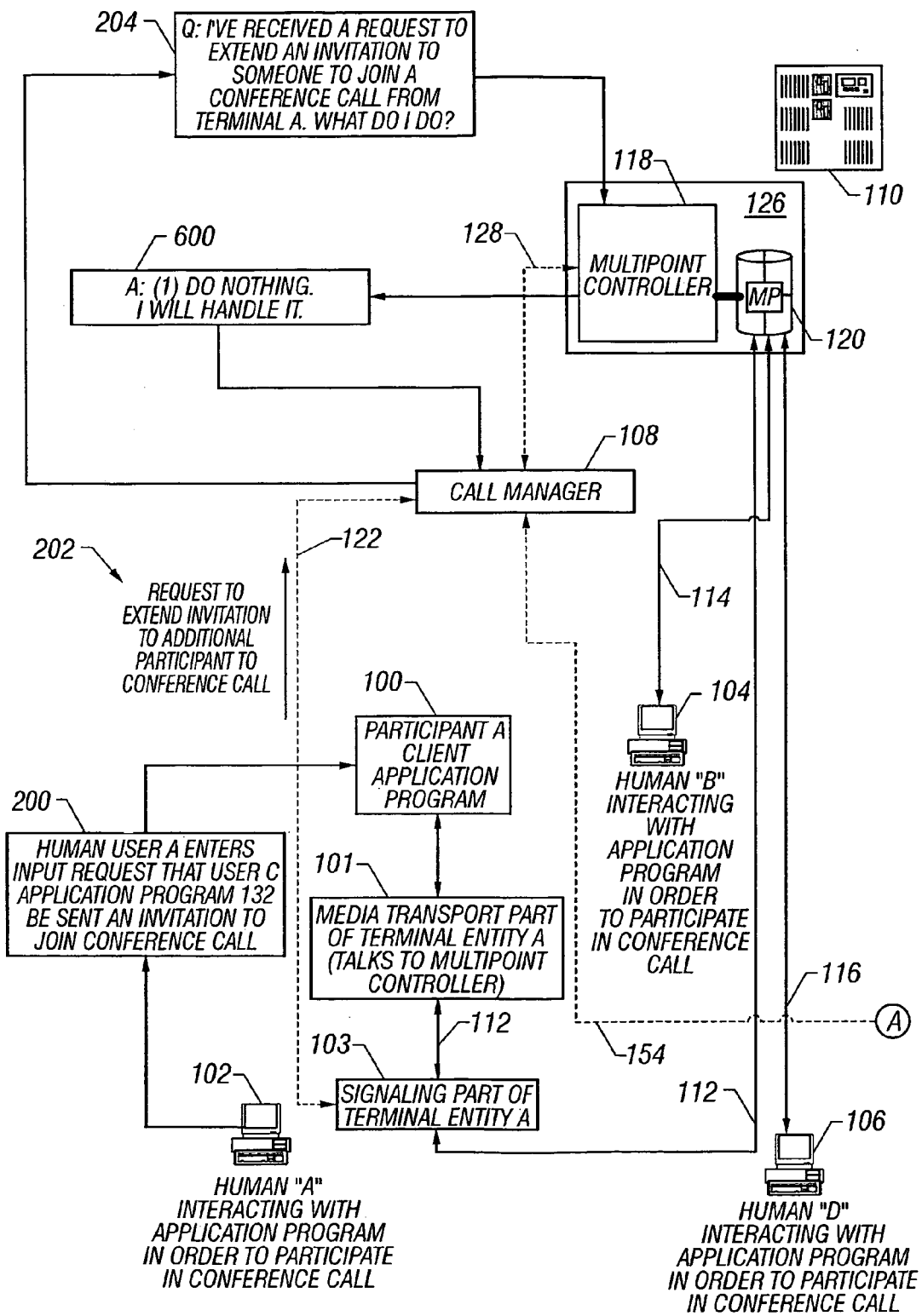
FIG. 6 depicts how processes and devices, described herein, begin to diverge radically from the related-art processes and devices depicted in related-art FIGS. 1–5, beginning at around event 204 as shown in related-art FIG. 2, and also shows that such divergence is substantially transparent to related-art processes and devices.
Figure 6B:
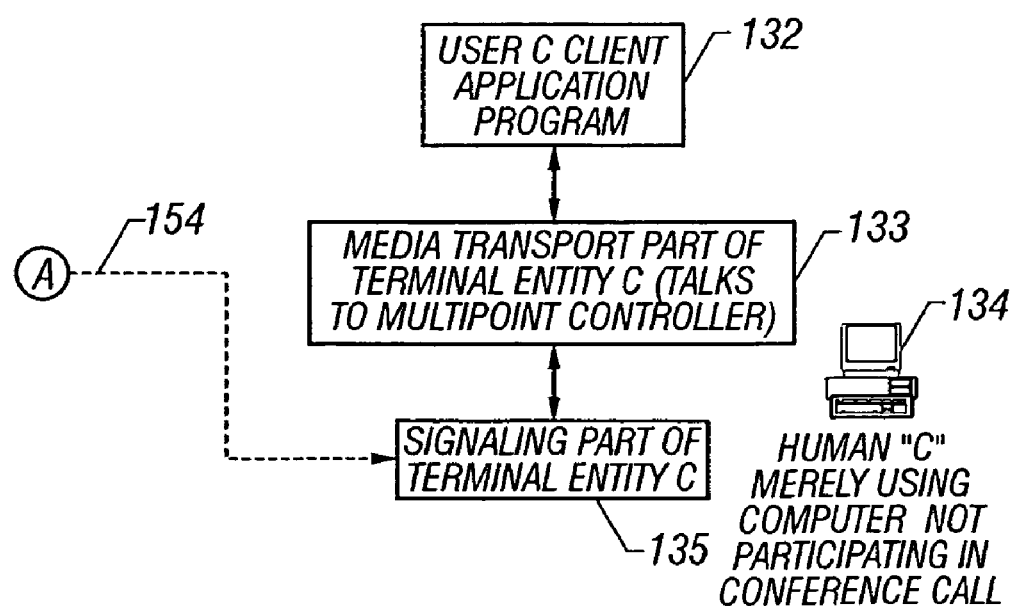
Figures 2, 18A:
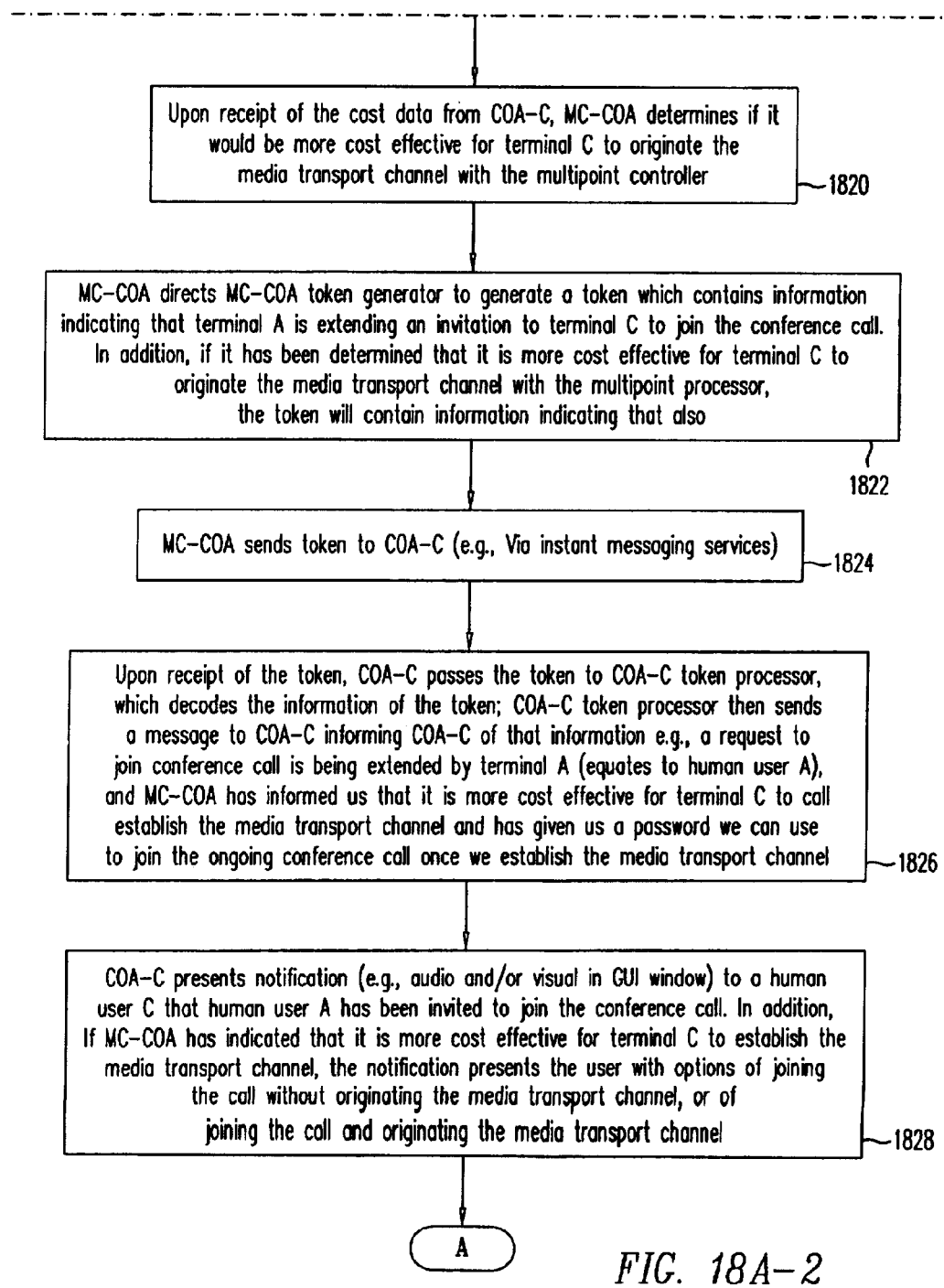

Referring now to FIG. 6, illustrated is a network having a flow of events substantially similar to the flow of events shown in related-art FIG. 2, up to and including the event of the sending of message 204 wherein call manager 108 informs multipoint controller 118 that call manager 108 has received a request from terminal entity A to extend an invitation to join the conference call to a non-participating party, and asks multipoint controller 118 for instructions. However, depicted is that instead of message 206 as described in related-art FIG. 2, shown in FIG. 6 is that in response to message 204 multipoint controller 118 sends message 600 which instructs the call manager to wait for further instructions.

Figure 7:
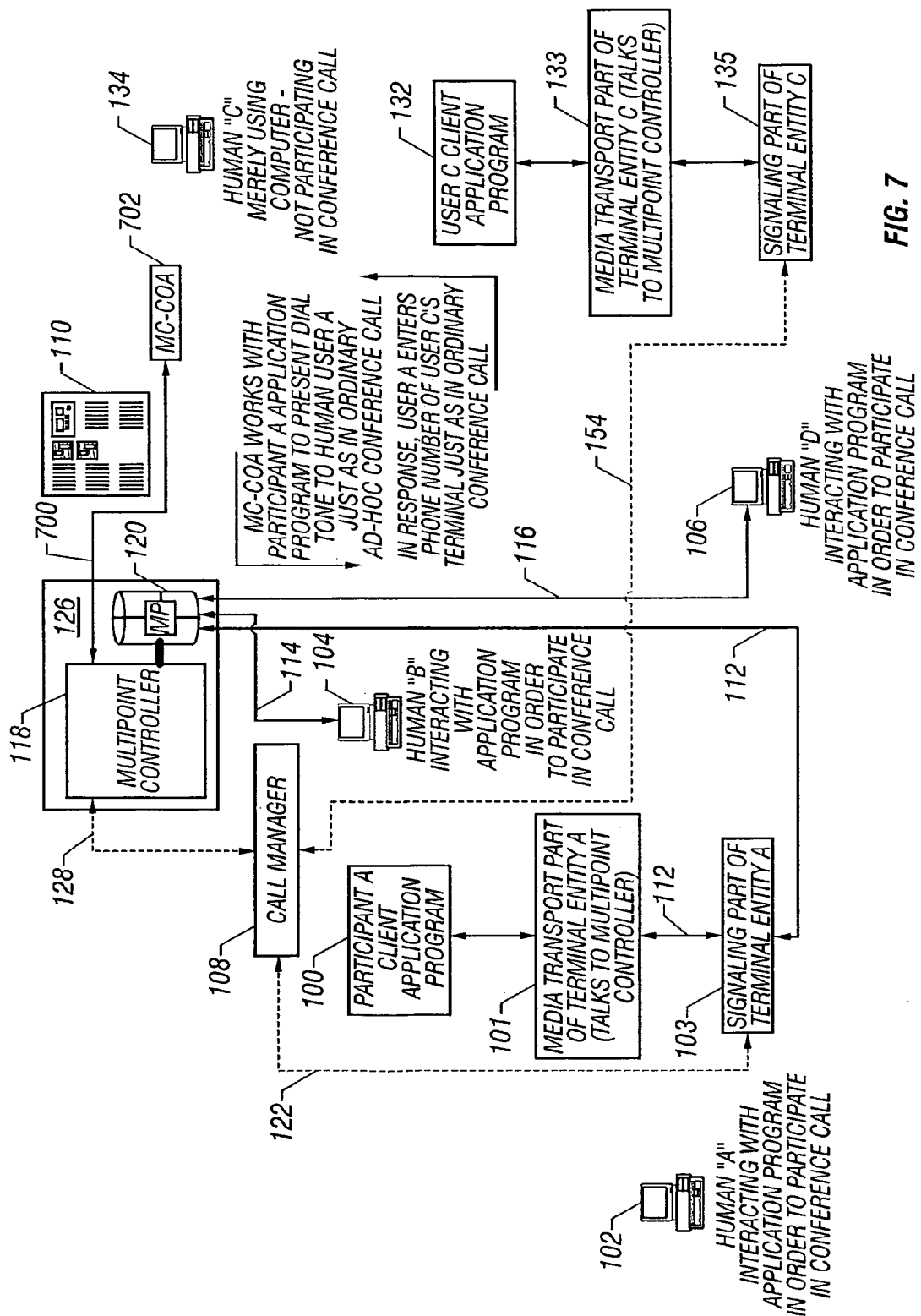
FIGS. 7–16 illustrate how processes and devices described herein provide for inviting and joining parties to conference calls, but in a way that substantially optimizes the way in which such parties are invited and added, and also show that the processes and devices described herein are substantially transparent to related-art processes and devices in that the processes and devices described herein operate with very little additional interaction with such related-art processes and devices.

With reference now to FIG. 7, since multipoint controller 118 has learned via message 204 that terminal entity A is requesting that an invitation to a conference call be extended to terminal entity C, shown is that multipoint controller 118 logically connects 700 (via call management channel 128) call manager 108 with multipoint controller call optimization application (MC-COA) 702, depicted as a program resident within network computer 110. Thereafter, shown is that MC-COA 702 communicates and works with call manager 108, via multipoint controller 118 and call management channel 128, such that human user A is presented with the same "user experience" depicted and described in relation to related-art FIG. 3, in that human user A is presented with a dial tone and allowed to enter the number of terminal entity C, which is associated with human user C to whom human user A desires to extend an invitation to join the conference call.

Figure 8:
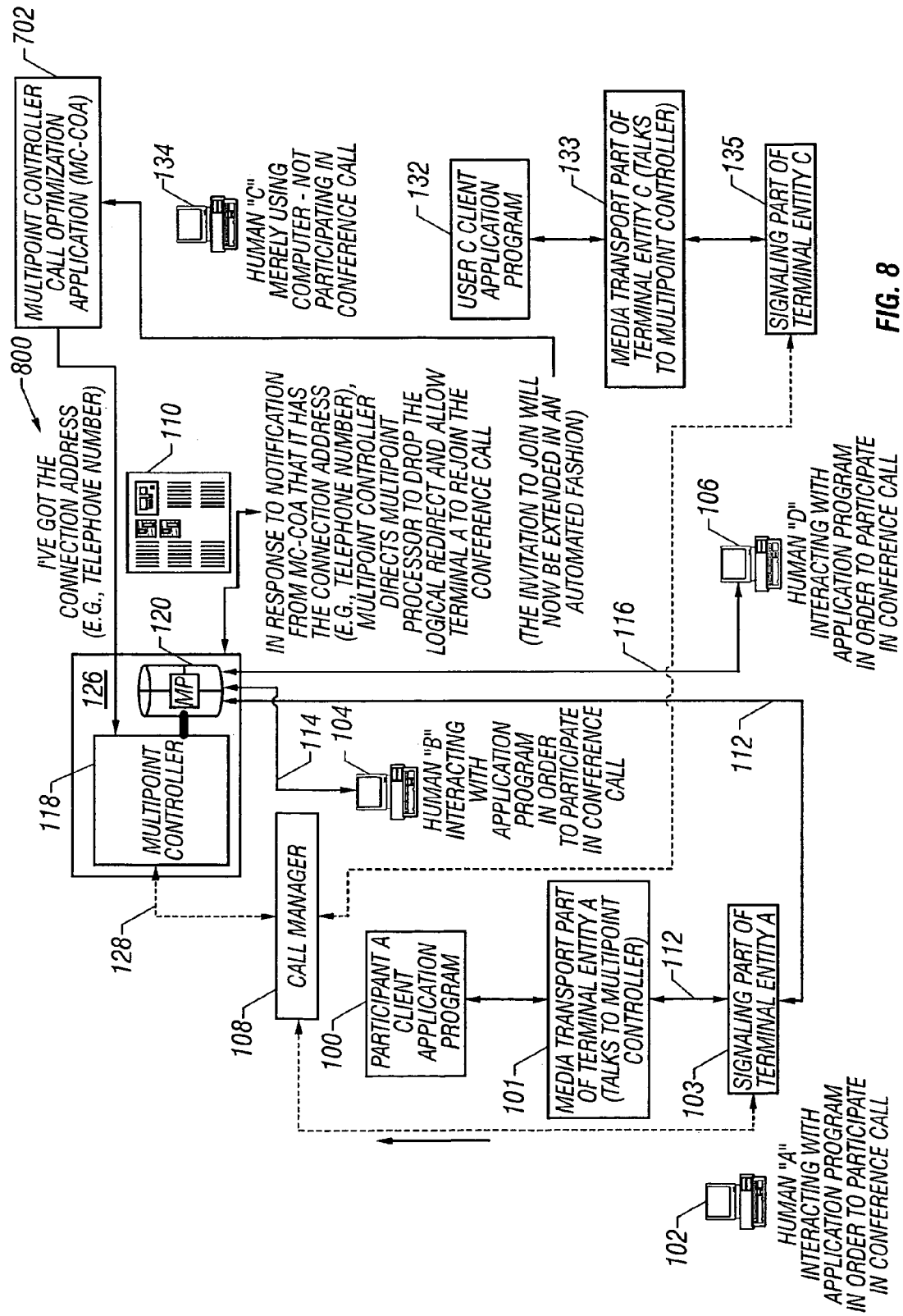

Referring now to FIG. 8, depicted is that, subsequent to MC-COA 702 receiving the connection address (e.g., a telephone number) of terminal entity C, MC-COA 702 sends message 800 informing multipoint controller 118 that MC-COA 702 has the connection address (e.g., a telephone network connection number). Thereafter, the invitation to join the conference call will be extended in an automated fashion as depicted and described below.

Figure 9A:
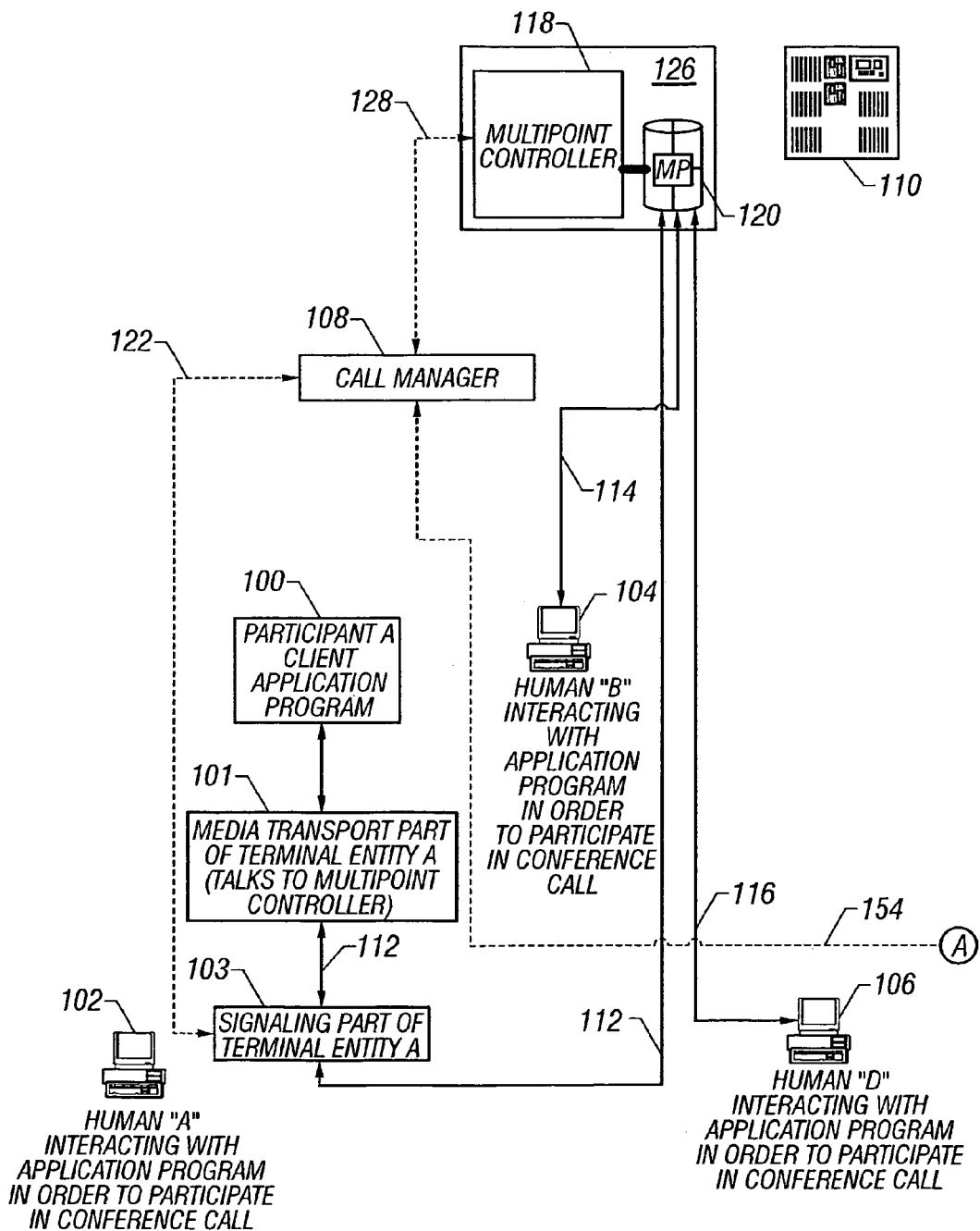
Figure 9B:
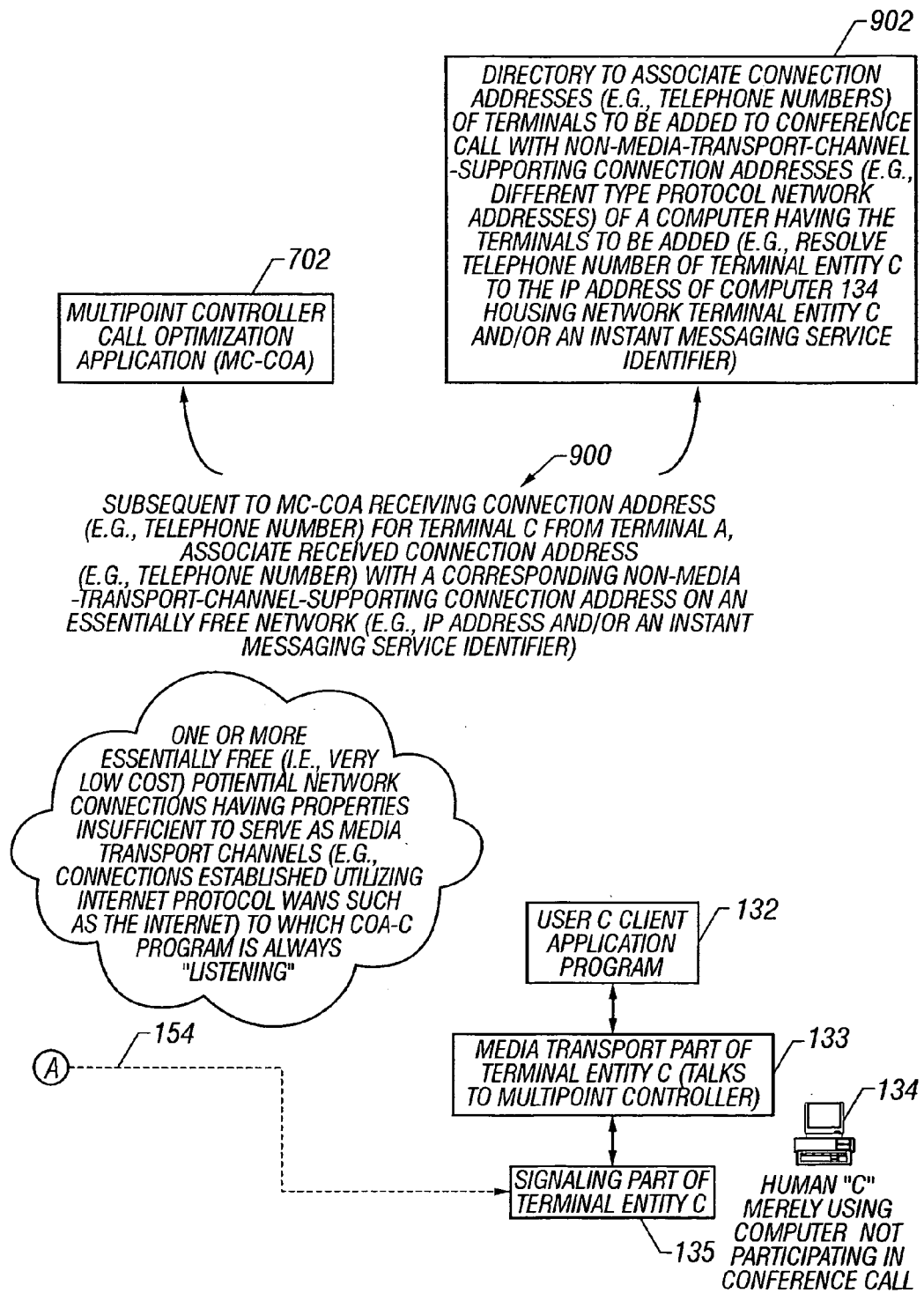

With reference now to FIG. 9, illustrated is that computer 110 (wherein multipoint controller 118 resides) and computer 134 (wherein terminal entity C resides) both have relatively constant access to one or more essentially free (i.e., very low cost, as the term "cost" was defined in the description of the related art section above) network connections whose properties, for one reason or another, render them insufficient to serve as media transport channels. (Such connections are types of "non-media-transport-channel supporting" connections. The term "media-transport-channel-supporting connection," as used herein, means a network connection having capabilities sufficient to support defined media transport channel requirements such as were discussed in the description of the related art section above. The term "non-media-transport-channel-supporting connection," as used herein, means a network connection having capabilities which are NOT sufficient to support defined media transport channel requirements such as were discussed in the description of the related art section above.) For reasons that will become apparent below, MC-COA 702 is going to attempt to establish a channel, via use of one of those essentially free network connections, with its counterpart (e.g., COA-C 1004 in FIG. 10) on computer 134.

Accordingly, once MC-COA 702 decides what type of connection it will use (e.g., MC-COA 702 decides to use an IP network connection), shown is that MC-COA 702 consults 900 directory 902 containing entries to associate connection addresses (e.g., telephone network numbers) of terminals with non-media-transport-channel-supporting connection addresses (e.g., convert to different type protocol network addresses; for example, convert the telephone number of terminal entity C to the IP address of computer 134 housing terminal entity C and/or an Instant Messaging service identifier associated with human C (e.g., if human C had an America Online (AOL) Instant Messenger username of "Mike_Smith," consultation 900 would return the AOL Instant Messenger username "Mike_Smith")). With the address so determined, MC-COA 702 can establish the desired channel either via IP services by use of the IP address of computer 134 housing terminal C or via Instant Messaging services via the instant messaging identifier associated with human C (e.g., username "Mike_Smith"). Note that use of the Instant Messaging services allows human C to be contacted at virtually any machine having Instant Messaging software which allows human user C's Instant Message username to be "seen," or detected as active, by Instant Messaging software). Background information on the Internet, Web, and Instant Messaging can be gleaned from P. Gralla, *How the Internet Works* (Millennium Edition 1999), which is hereby incorporated by reference in its entirety; for background information specifically regarding Instant Messaging, see especially pages 114–115 of *How the Internet Works*.

Figure 10A:
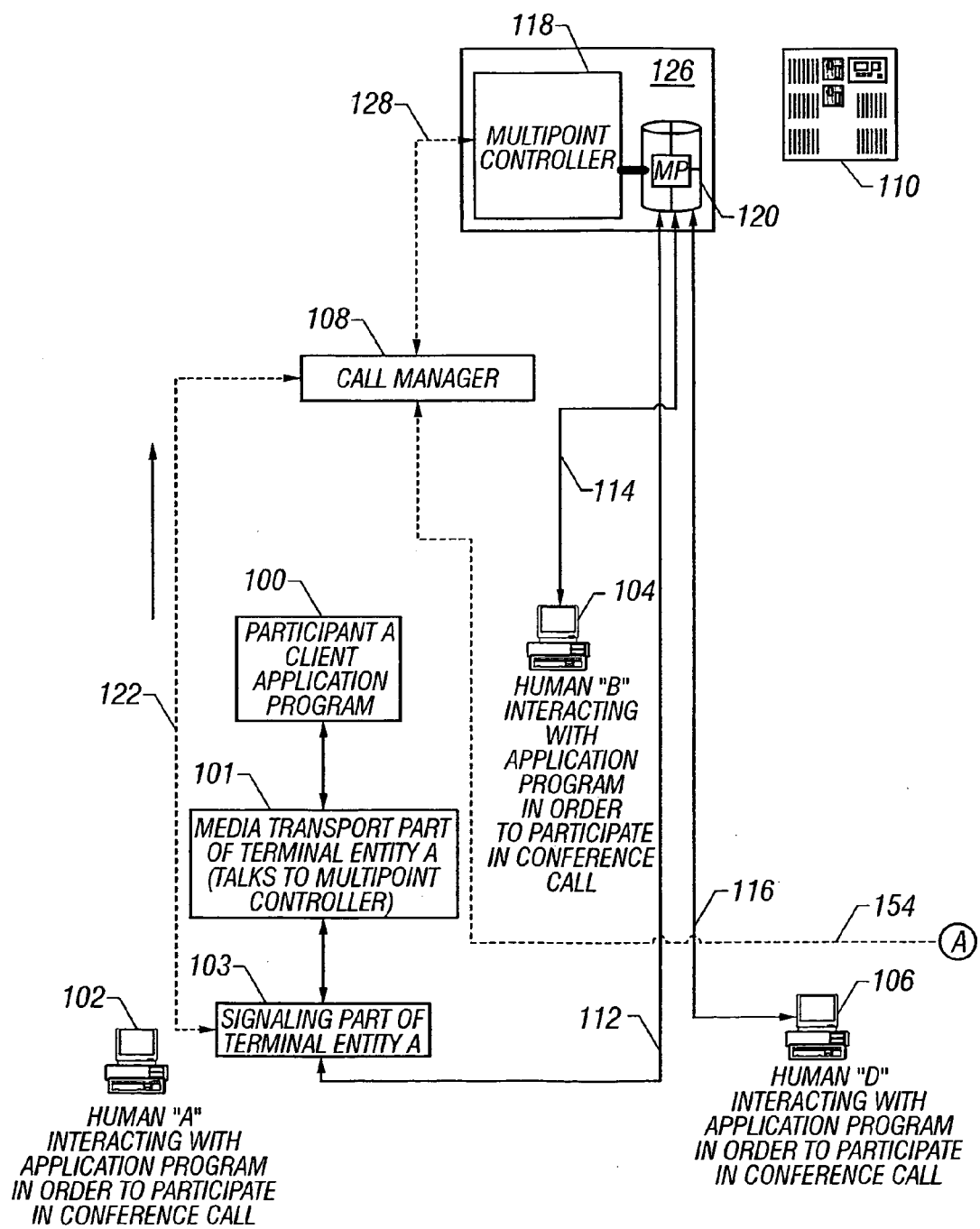
Figure 10B:
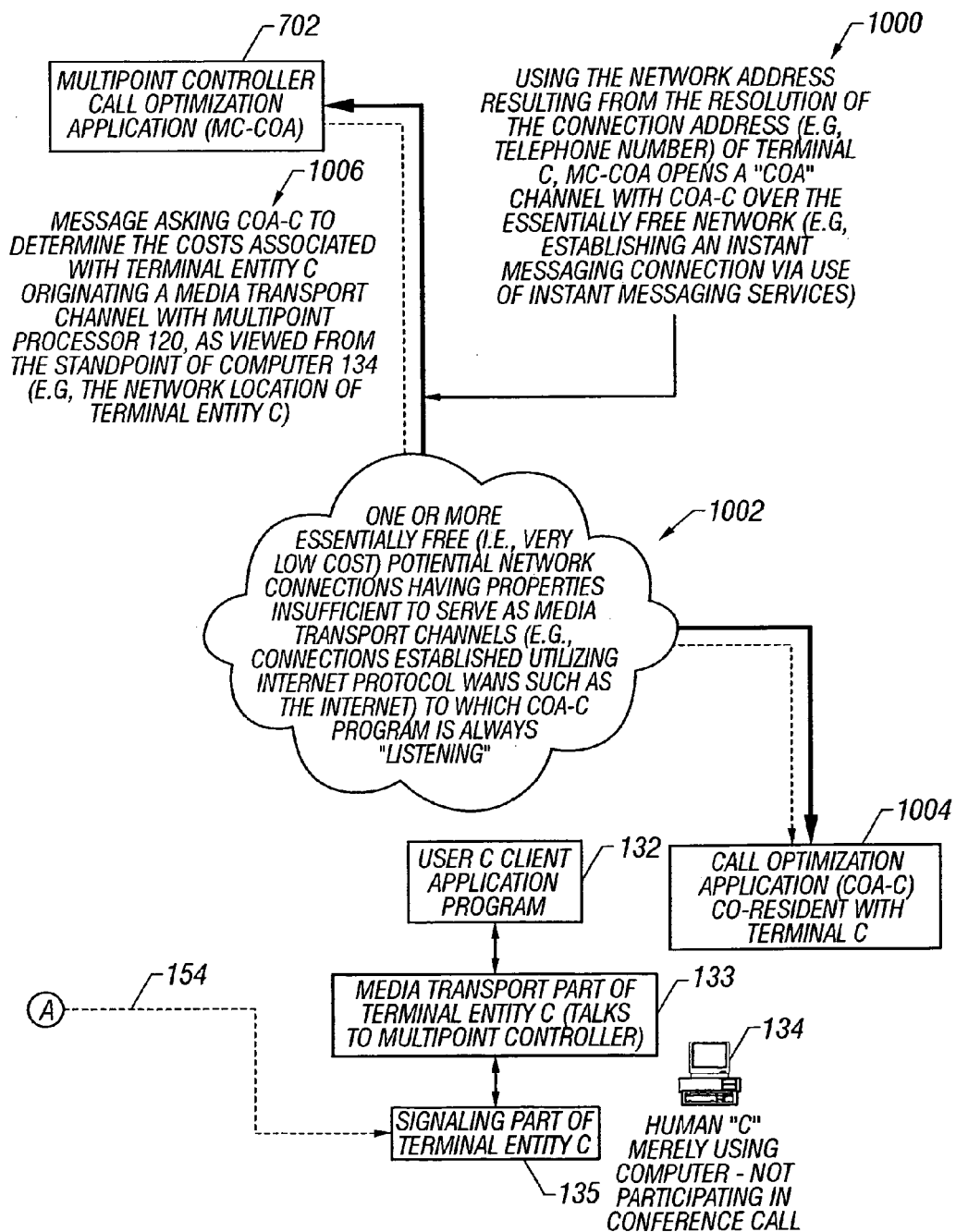

Referring now to FIG. 10, shown is that MC-COA 702 using the network address resulting from the resolution of the connection address (e.g., a telephone number or Instant Messaging username (e.g., "Mike_Smith")) of terminal entity C, opens 1000 "COA" channel 1002 with Cost Optimization Application co-resident with terminal entity C (COA-C) 1004 over an essentially free network (e.g., via opening an IP connection via an IP network or via opening an Instant Messaging connection via use of Instant Messaging services such as AOL Instant Messenger services). Subsequent to opening COA channel 1002, MC-COA 702 sends message 1006 to COA-C 1004 asking COA-C 1004 to determine the costs associated with terminal entity C originating a media transport channel with multipoint processor 120, as viewed from the standpoint of computer 134 (e.g., the network location of terminal entity C).

Figure 11A:
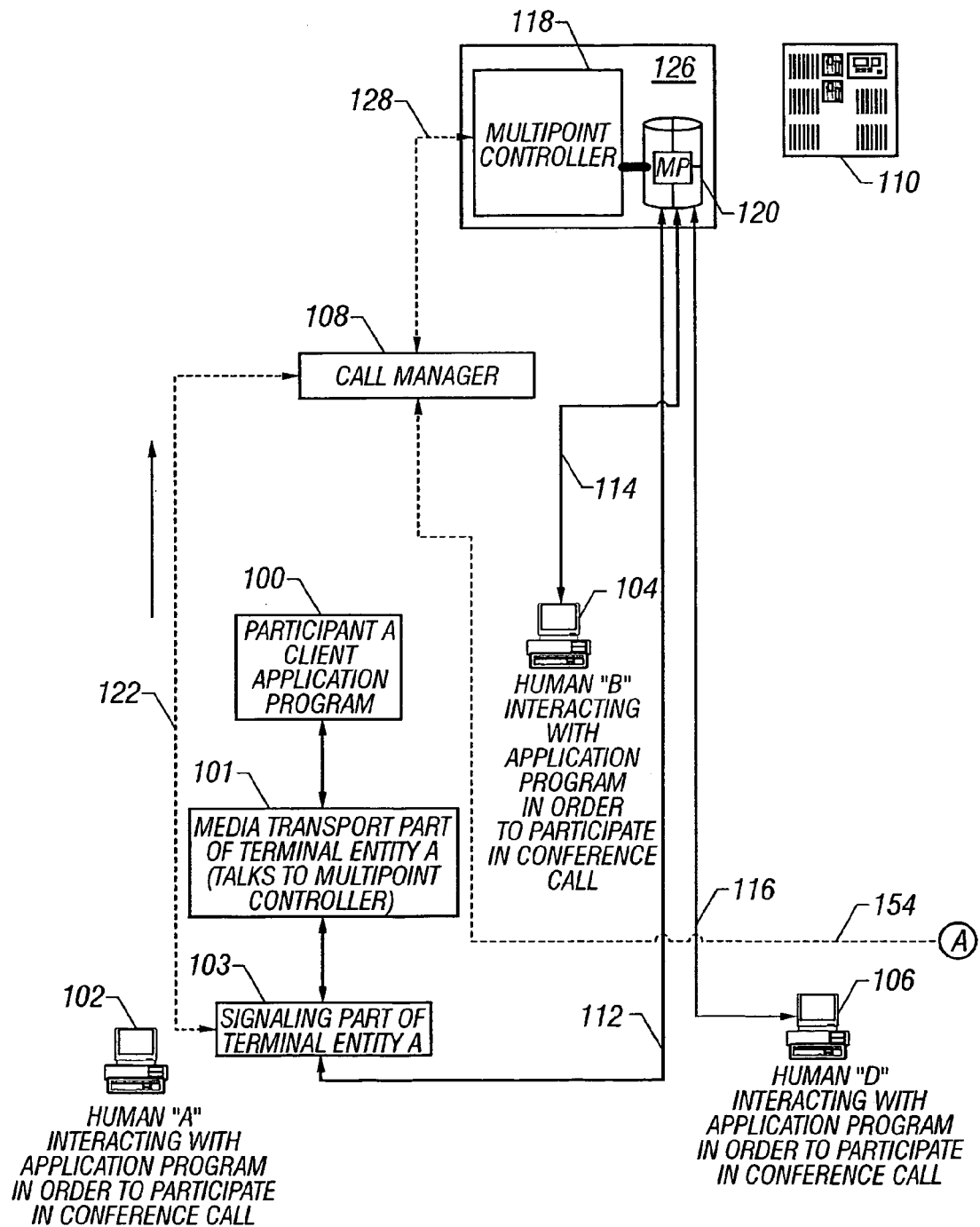
Figure 11B:
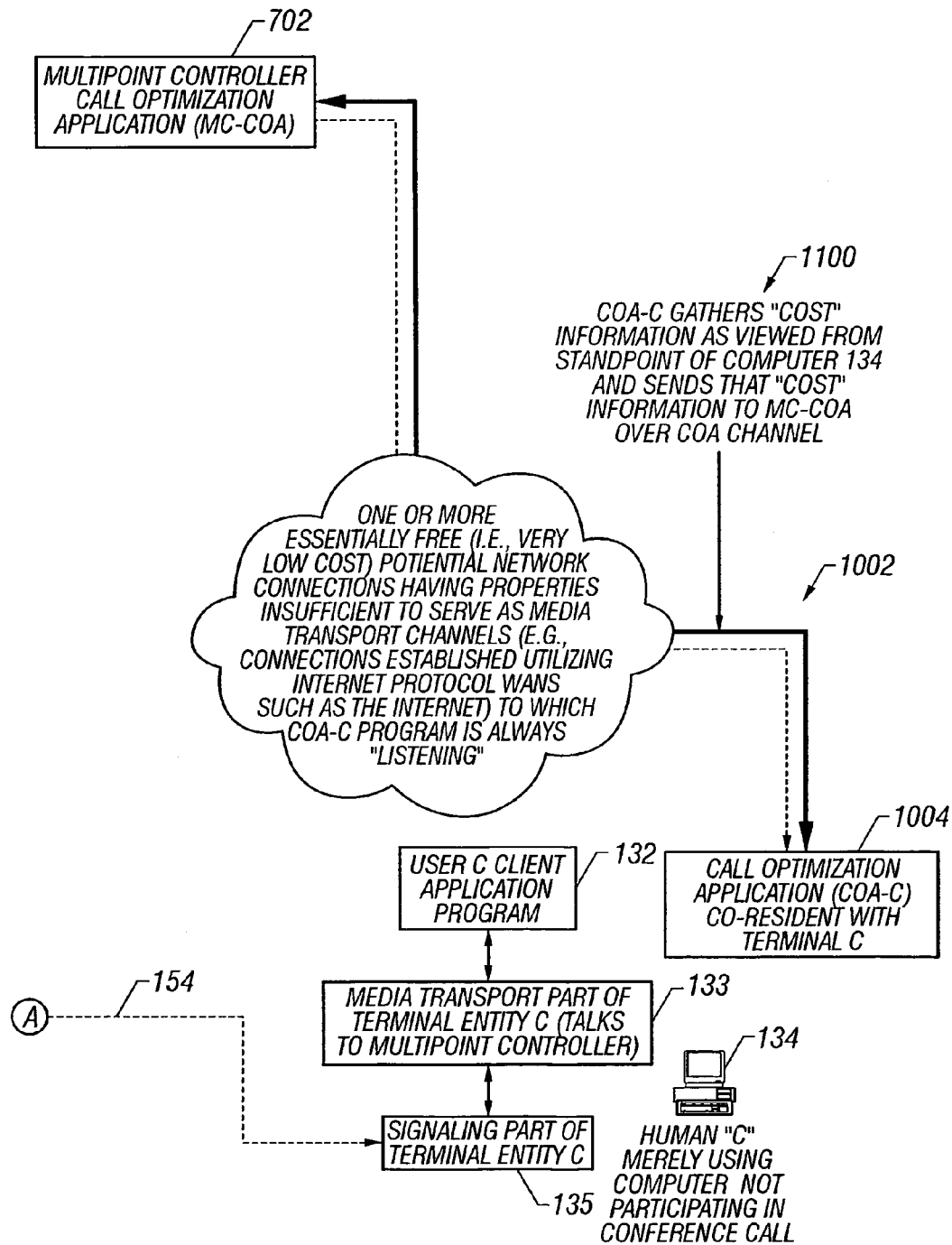

With reference now to FIG. 11, depicted is that COA-C 1004 gathers cost information, as viewed from the standpoint of computer 134 (e.g., how much it would cost if terminal entity C originated a media transport channel with multipoint processor 120), and sends 1100 such gathered cost information to MC-COA 702 over COA channel 1002. Once MC-COA 702 has this information, it can make cost optimization assessments.

Figure 12A:
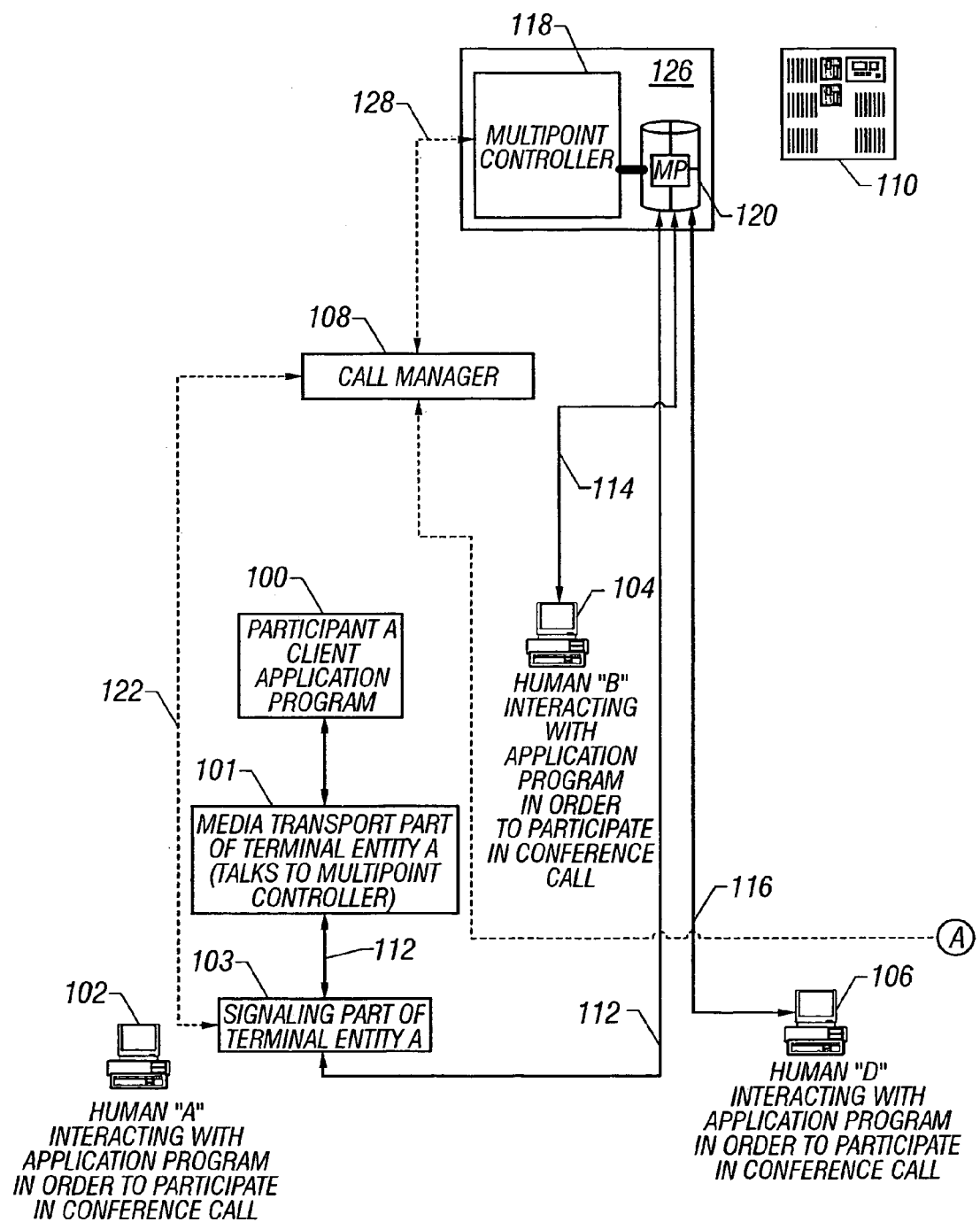
Figure 12B:
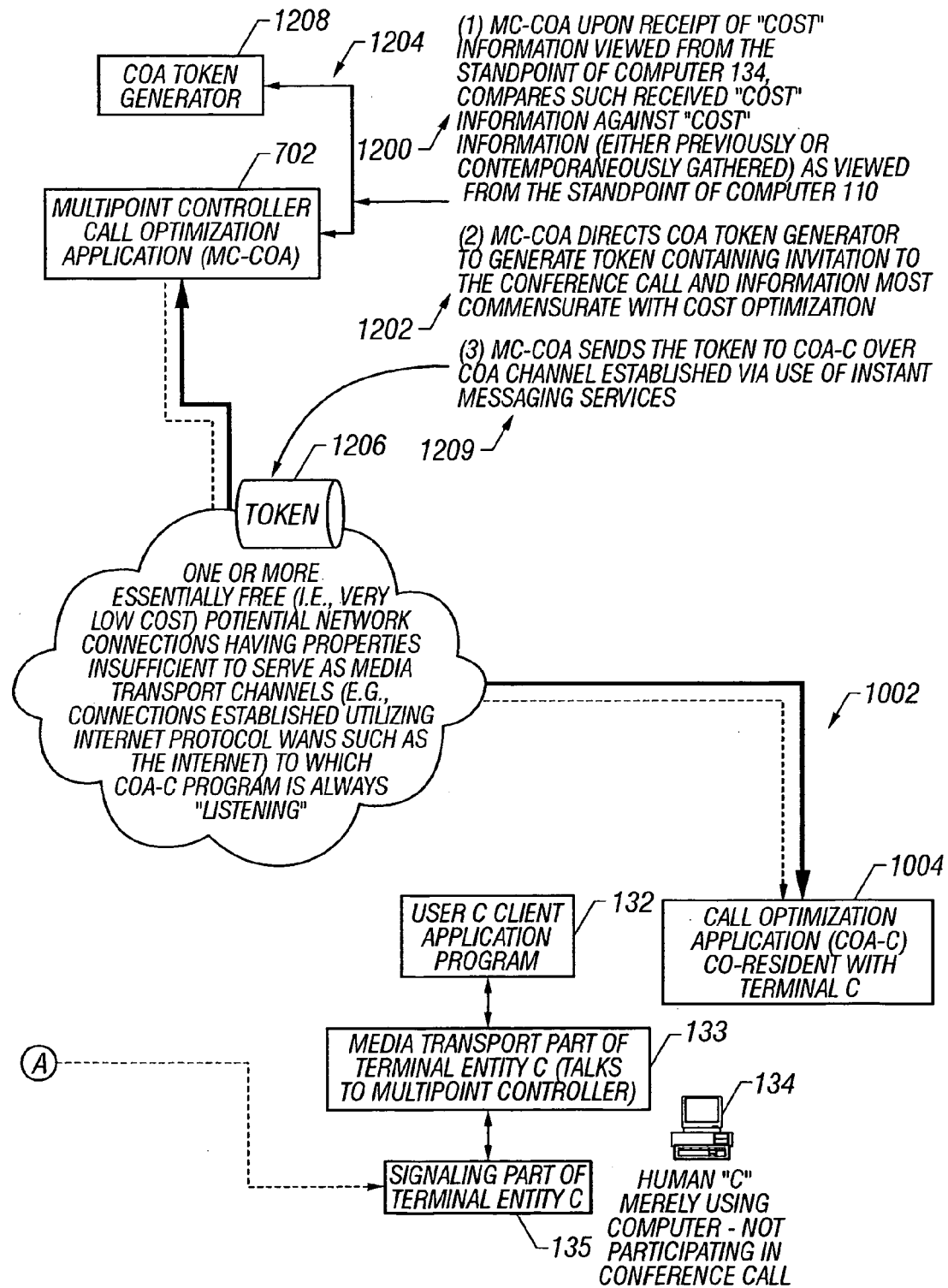

Referring now to FIG. 12, illustrated is event 1200 wherein is depicted that MC-COA 702, upon receipt of "cost" information viewed from the standpoint of computer 134 (i.e., message 1100), compares such received "cost" information against "cost" information (either previously or contemporaneously gathered) associated with multipoint controller 118 originating a media transport channel with terminal entity C, as viewed from the standpoint of computer 110 (the network location where multipoint controller 118 is resident). Thereafter, event 1202 shows that MC-COA 702 directs 1204 COA token generator 1208 to generate token 1206 containing information relating that an invitation to the conference call is being extended by human user A along with the information most commensurate with cost optimization (e.g., whether it would be more cost effective for terminal entity C to originate a media transport channel to multipoint processor 120, as opposed to vice versa). Thereafter, event 1209 depicts that MC-COA 702 sends token 1206 to COA-C 1004 over COA channel 1002 (recall that COA channel 1002 can be established in various ways, such as via Instant Messaging services).

Those skilled in the art will recognize that token 1206 may contain numerous fields containing information related to the invitation and/or call optimization criteria. In one embodiment, the token contains a "token ID" field, a "conference ID" field (identifying the ongoing conference call), a "network address of the computer wherein the multipoint controller resides" field (such as an IP address or an Instant Messaging services username (e.g., username "Multi-Point_Controller" utilized to allow COA channel establishment and communication, since the COA channel can be established over many different types of networks and services such as IP networks or Instant Messaging services), a "request that invitee originate media transport channel into a conference call" field (where such request can be made for cost advantage or other reasons, as described below), a "conference password" field (to be used to enter a conference call should an invitee originate a media transport channel into a conference call), a "name of the multipoint call initiator for toll settlement" field (sometimes utilized to "reverse the charges" when an invitee agrees to originate a call into a conference call, but doesn't want to bear the charges of such origination), and also may have a "names of other participants in the conference call" field.

Figure 13A:
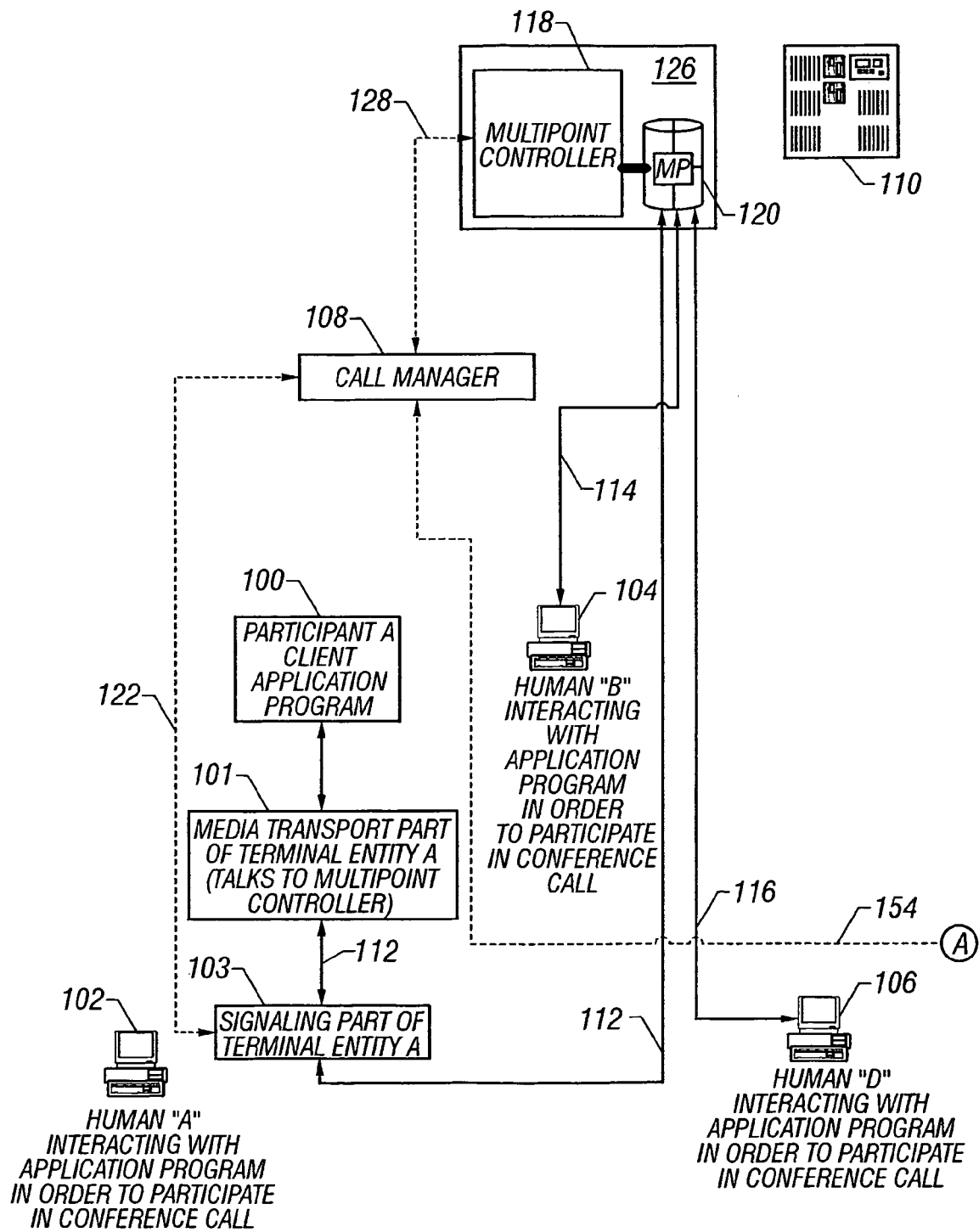
Figure 13B:
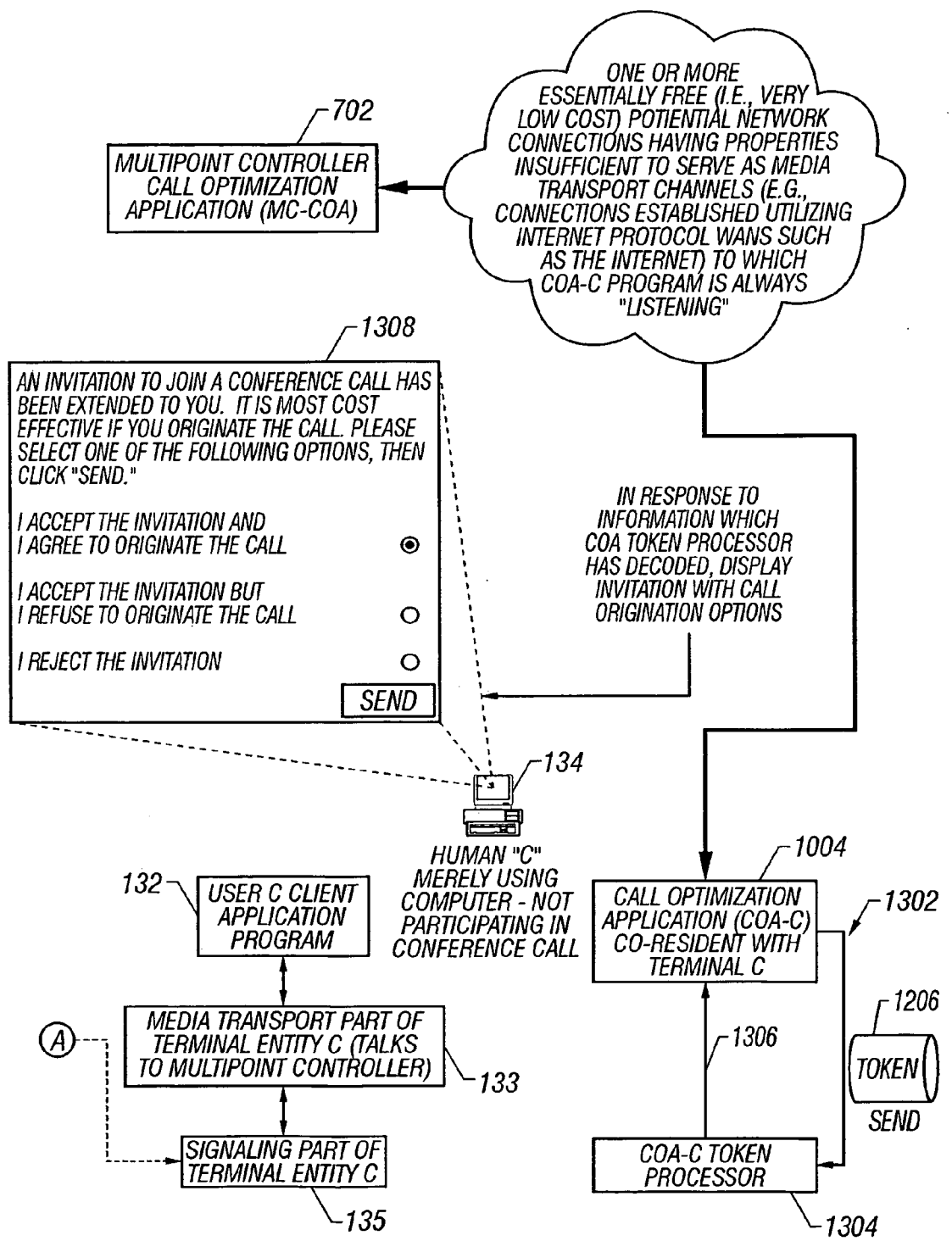

With reference now to FIG. 13, shown is that COA-C 1004 upon receipt of token 1206, passes 1302 token 1206 to COA-C token processor 1304. COA-C token processor 1304 decodes the information in token 1206 and informs, via message 1306, COA-C 1004 of that information. Shown is that, in response to message 1306, COA-C 1004 presents graphical user interface (GUI) 1308 on a visual display device of network station 134 wherein varying buttons can be (depending on the outcome of the cost optimization decision, discussed above) presented stating that human user C is being invited to a conference call by human user A, and is being requested to initiate a call into the conference. Shown is the set of buttons which would occur if it had been determined that it was most cost effective for terminal entity C to originate the media transport channel.

Figure 14A:
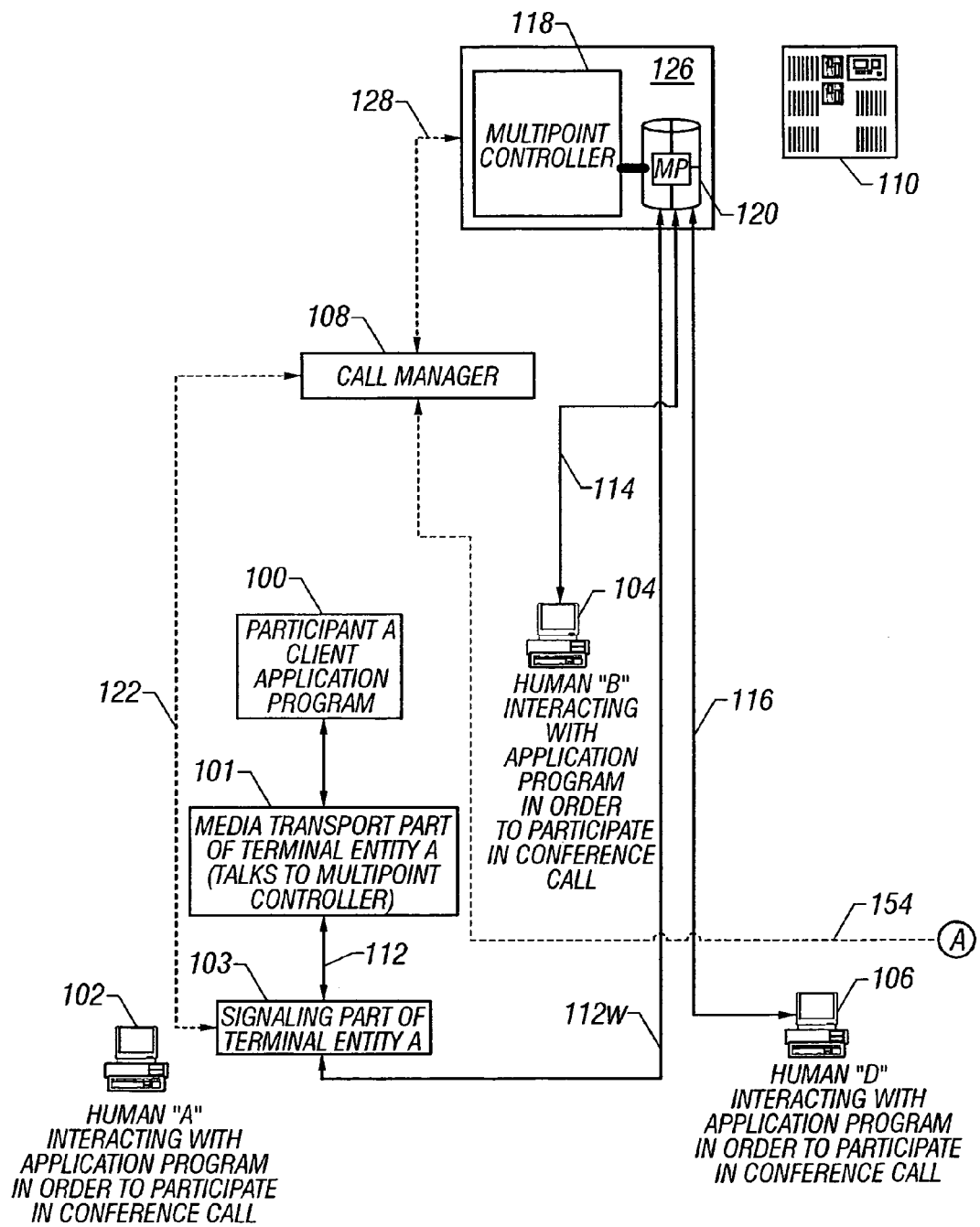
Figure 14B:
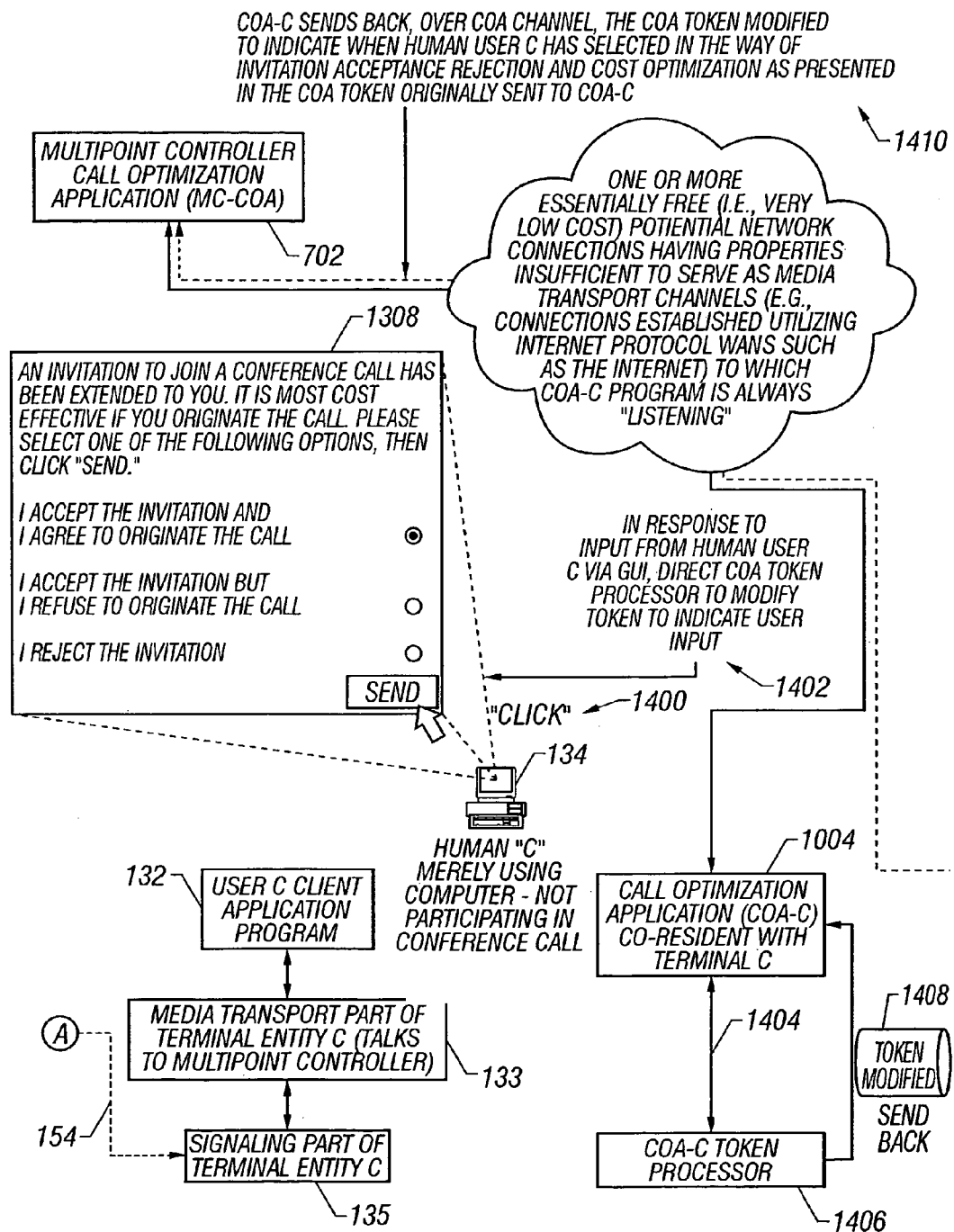

Referring now to FIG. 14, shown is event 1400 of human user C "clicking" on the send button of GUI 1308 (any invitation choice could be selected, but for sake of illustration shown in FIG. 14 is that the first choice is selected). Thereafter event 1402 depicts that in response to input from human user C via GUI 1308, COA-C 1004 sends message 1404 to COA-C token generator 1406 to modify token 1206 to indicate the invitation option selected by human user C's input. Thereafter, COA-C token generator 1406 passes modified-token 1408 to COA-C 1004 which thereafter sends 1410 modified-token 1408 (having fields modified to show the invitation option indicated by human user C) back to MC-COA 702.

Figure 15:
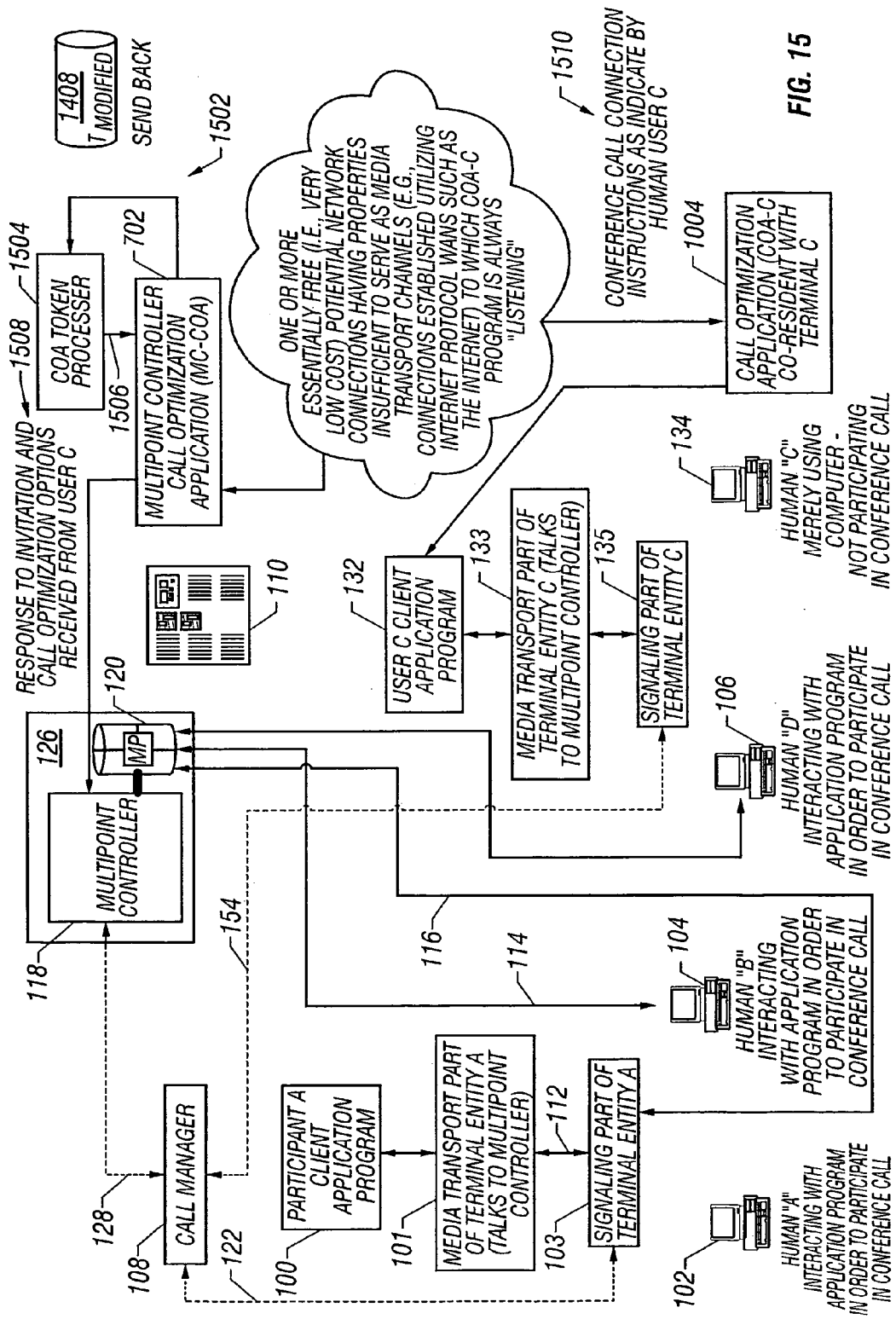

With reference now to FIG. 15, depicted is an event wherein is shown that MC-COA 702, upon receipt of modified-token 1408, passes 1502 modified-token 1408 to MC-COA token processor 1504. MC-COA token processor 1504 decodes the information in modified-token 1408 and informs, via message 1506, MC-COA 702 of that information. Shown is that, in response to message 1506, MC-COA 702 sends message 1508 containing information as to human user C's response to the extended invitation and any call optimization options which were presented via GUI 1308 described in relation to FIG. 13. Also shown is that COA-C 1004 sends message 1510 to application program 132, if human user C elected to originate the media transport channel from his machine, directing that terminal C originate the media transport channel.

Figure 16:
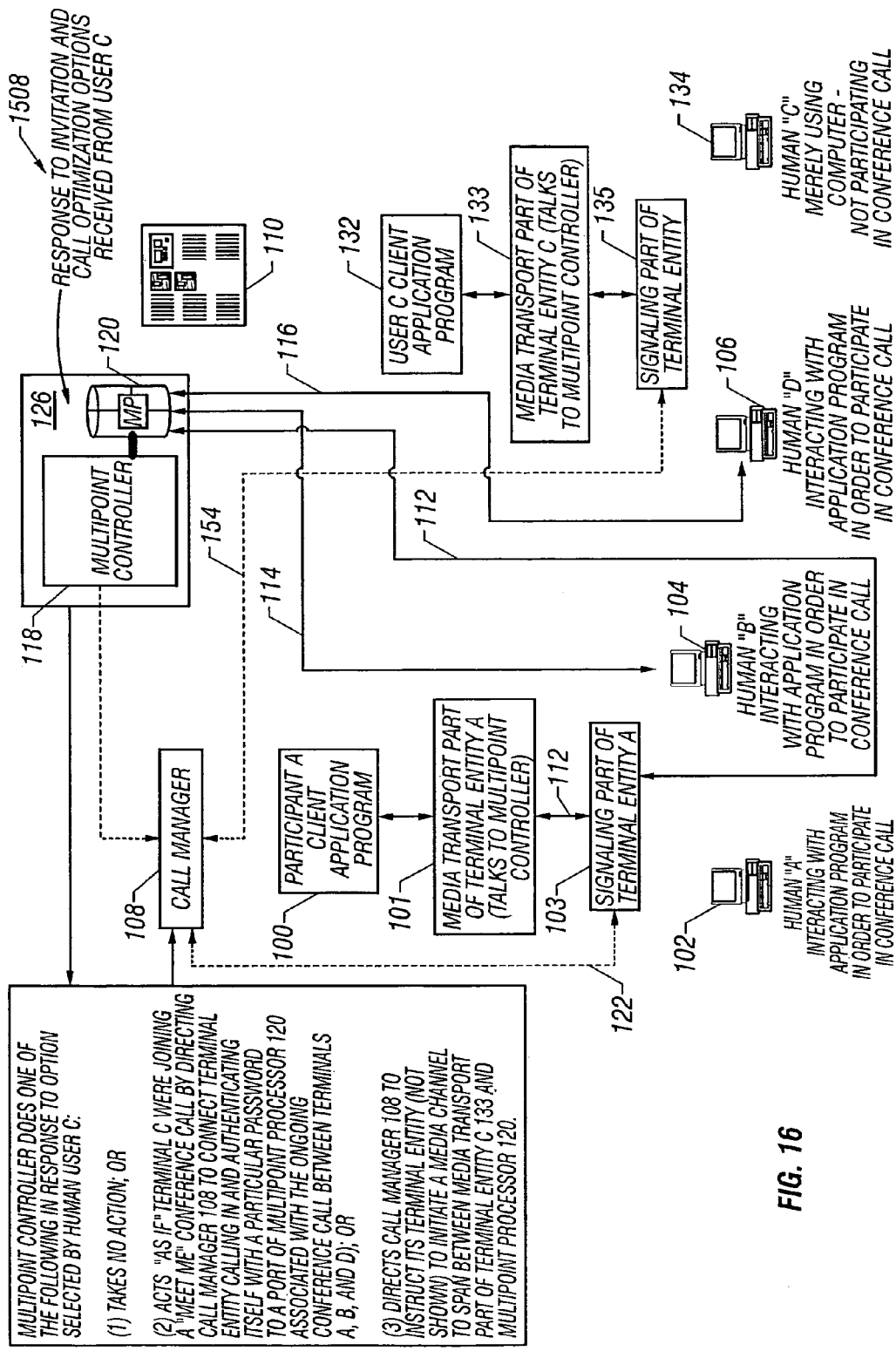

Referring now to FIG. 16, illustrated is that in response to message 1508, multipoint controller 118 can: (a) take no action (e.g., if user C actively rejected the invitation), (b) act "as if" terminal entity C were joining a "meet me" conference call by directing call manager 108 to connect any terminal calling in and authenticating itself with a conference password (which was contained in token 1206 and modified-token 1408) to a port of multipoint processor 120 associated with (via a conference ID which was contained in token 1206 and modified-token 1408) the ongoing conference call between terminals A, B, and D; or (c) direct call manager 108 to initiate a media transport channel to span between media transport part 133 of terminal entity C and multipoint processor 120. With network connection instructions now fully specified, a media transport channel can be established in a substantially cost-optimized fashion between multipoint processor 120 and media transport part 133 of terminal entity C.

Figure 17:
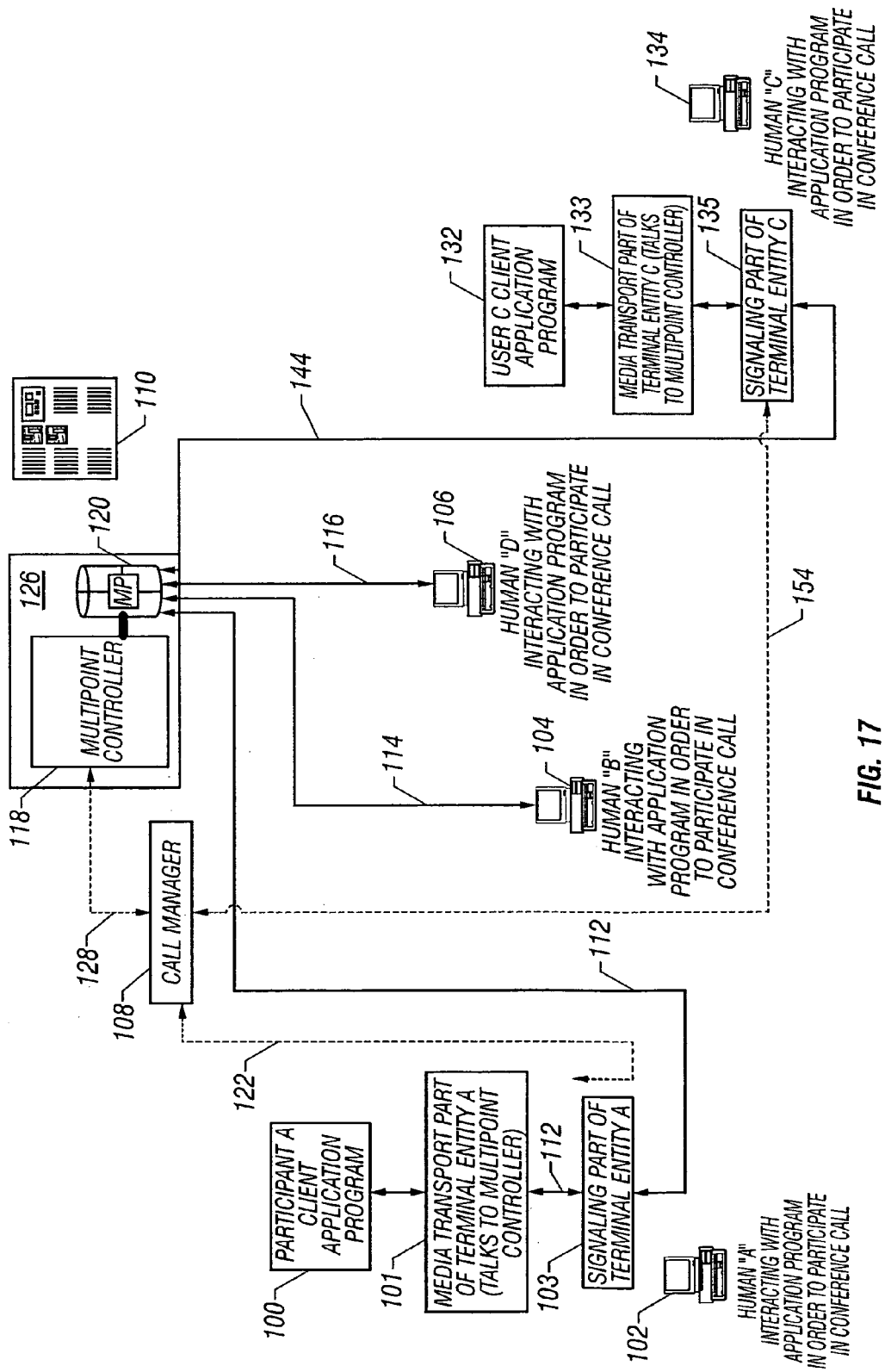
FIG. 17 shows how the processes and devices described herein achieve the result of the addition of a user to a conference call as was depicted related-art FIG. 5, but in a much more call optimized fashion than that available in the related-art.

Referring now to FIG. 17, depicted is that a media transport channel 144 has been established in a substantially cost-optimized fashion (e.g., in accord with the actions described in relation to FIG. 16) between multipoint processor 120 and media transport part 133 of terminal entity C.

Figure 1:
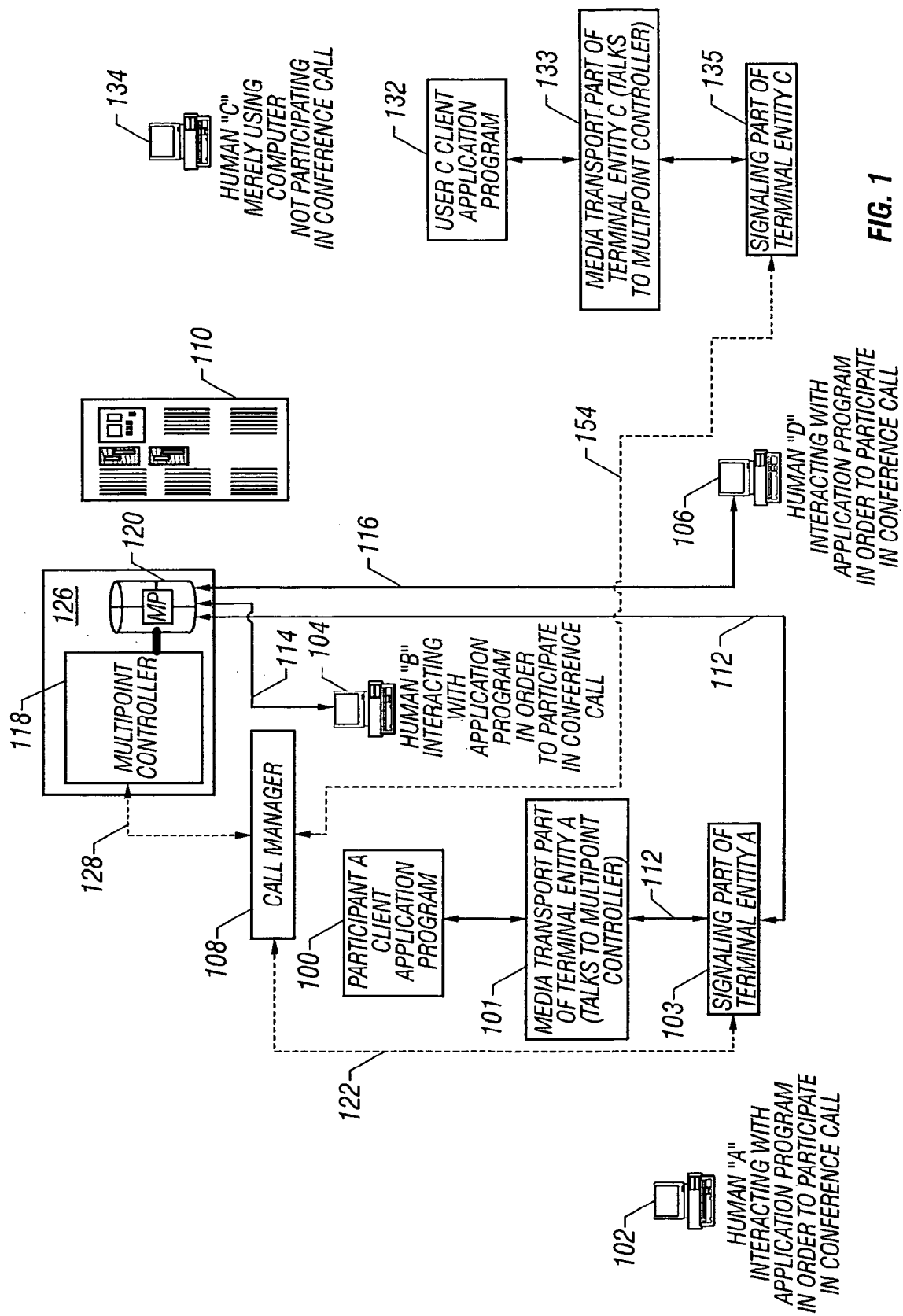
Figure 2A:
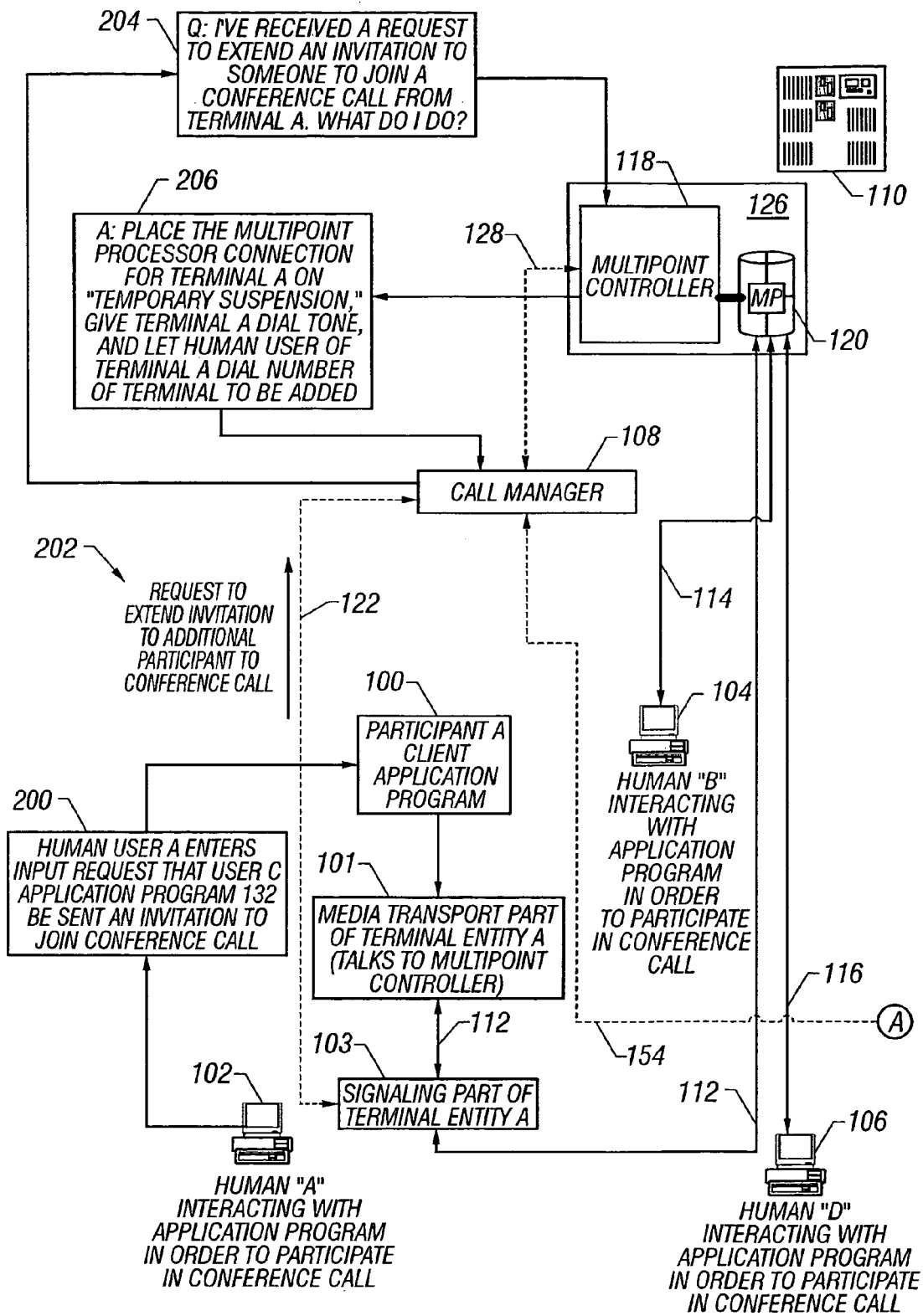
Figure 2B:
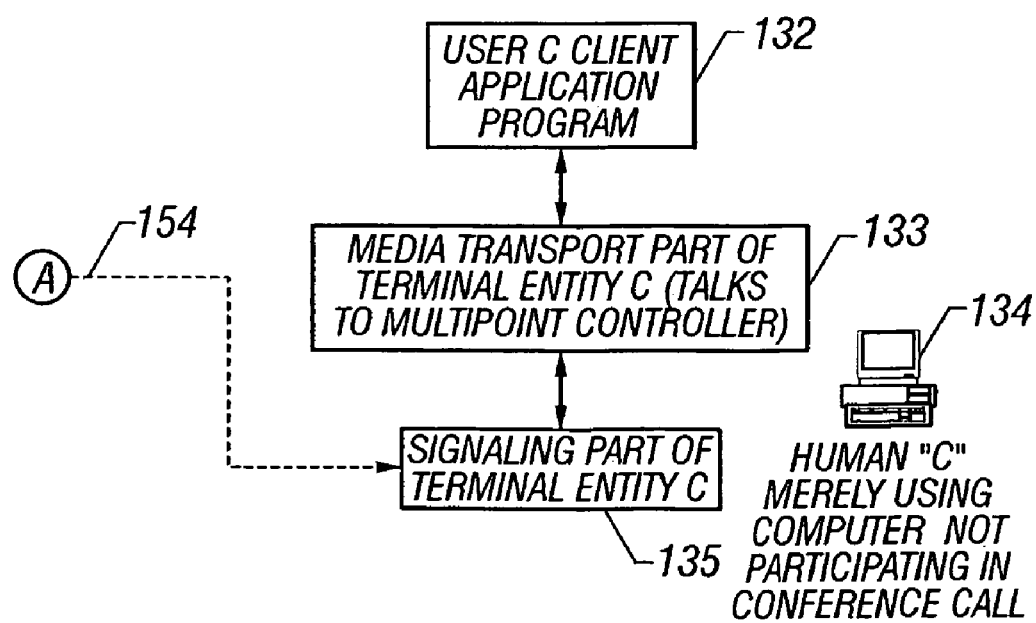
Figure 4A:
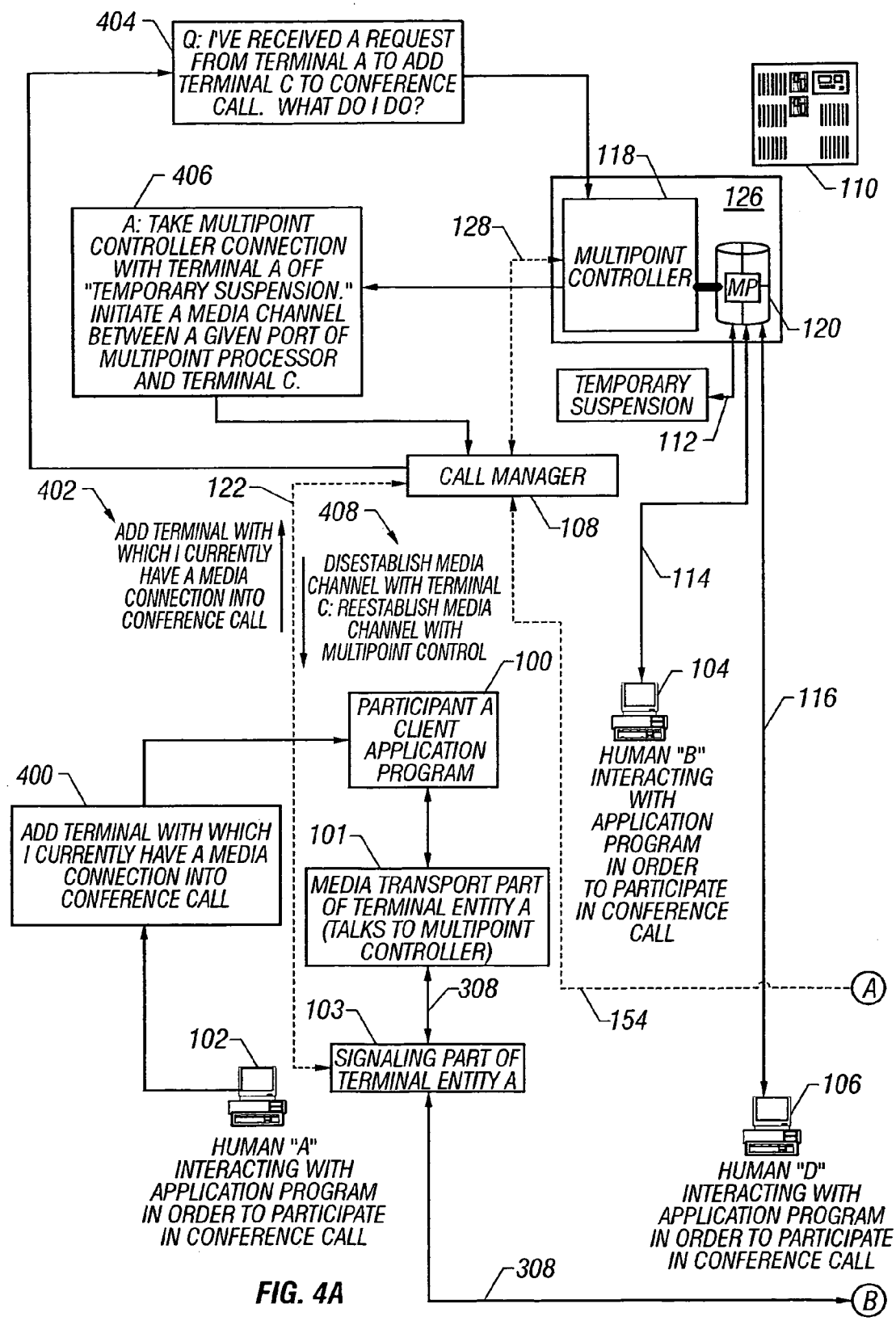
Figure 4B:
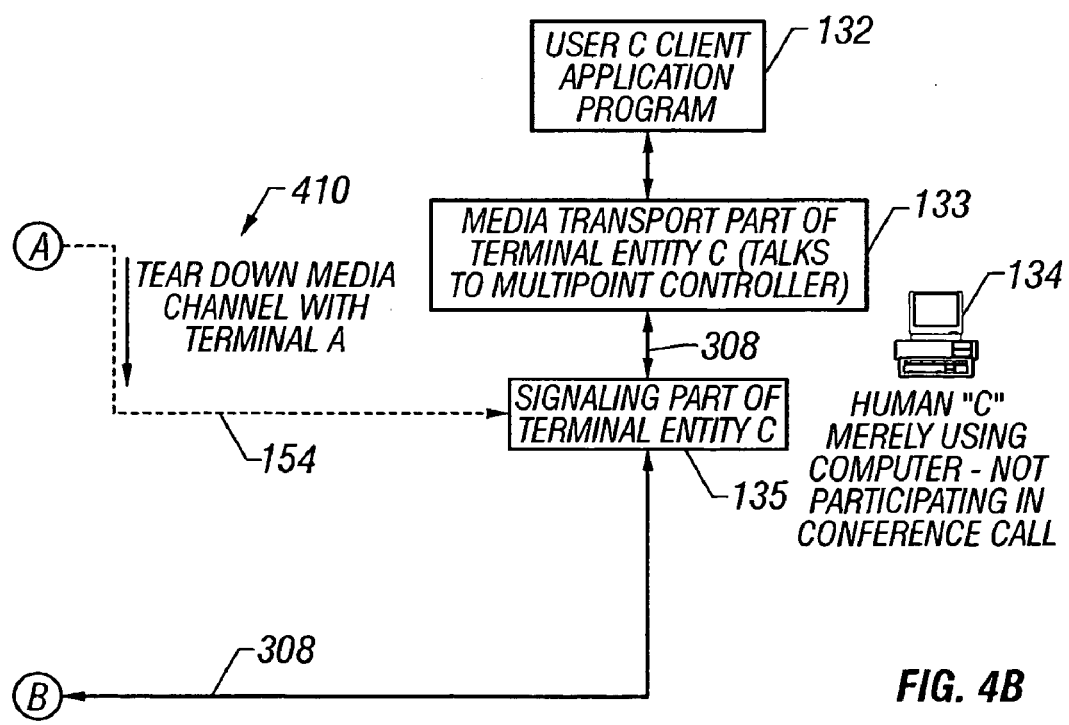
Figure 5:
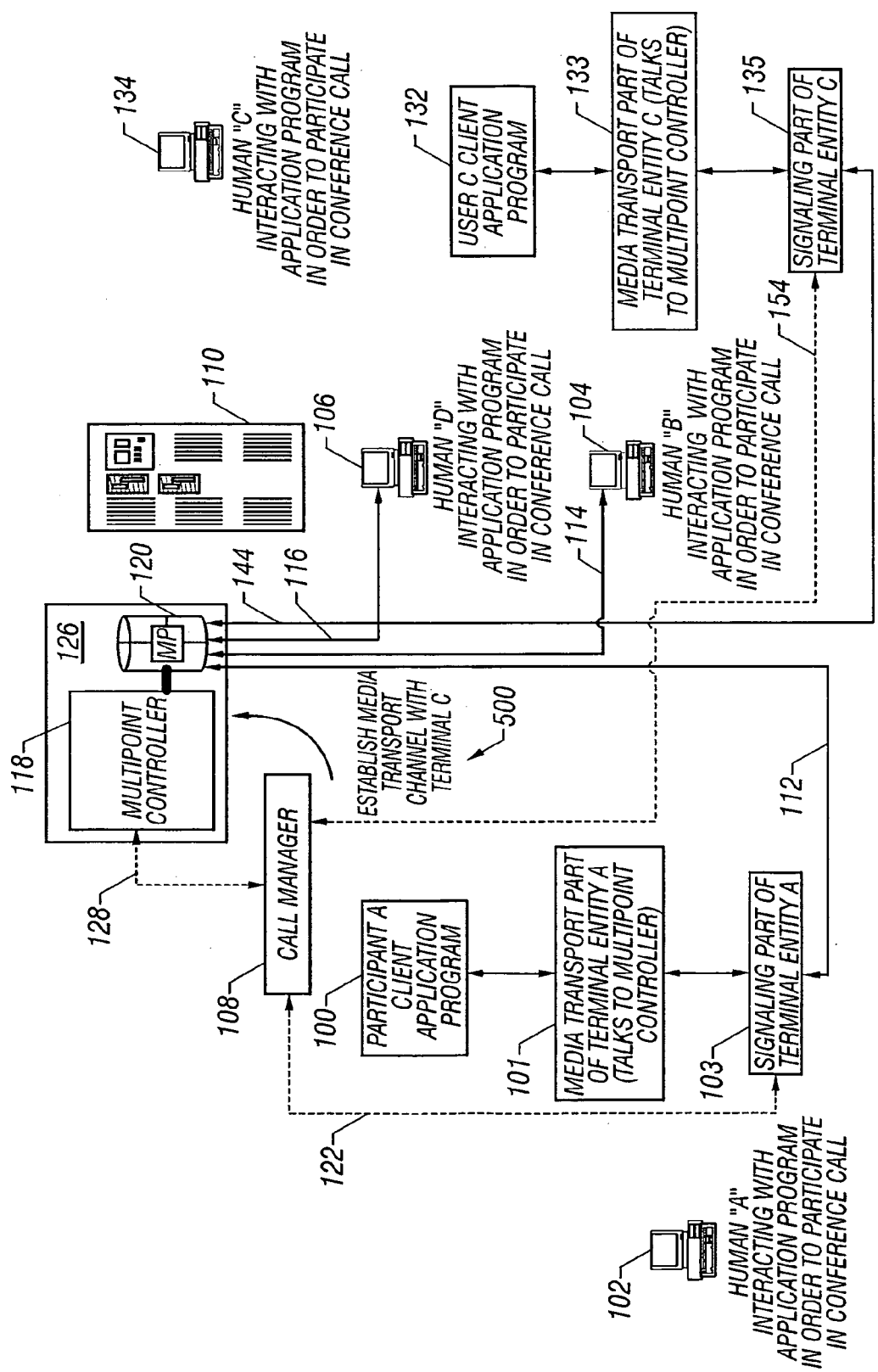

Note that the state of the network in FIG. 17 is substantially the same as that depicted in related-art FIG. 5. However, comparing the series of events depicted in FIGS. 1–5 with the series of events depicted in FIGS. 6–17, it can be seen that the network state reached in FIG. 17 was reached without establishing media transport channel 308 of related-art FIG. 3, and that the direction the origination of media transport channel 144 has been achieved in a substantially optimized fashion. This gives significant cost efficiency advantages over the related art.

In addition to the foregoing, also note that foregoing described scheme allows an invitee to an ad-hoc conference call to conference in "as if" the invitee were joining a "meet me" conference call in a way that is substantially backwards compatible with existing systems. The way in which this is done is described in detail above and below, but can be summarized as follows. When a terminal is invited to join an ad-hoc conference call, a "conference id" unique to the invited terminal is created. Thereafter, if it is determined to be more advantageous for the invitee to call in to the ad-hoc conference call, a multipoint controller instructs a call manager that if a terminal calls in and authenticates itself with a password, the call manager should connected the calling in terminal to a particular port of a multipoint controller, where that particular port will be one that will give the calling in terminal access to the ad-hoc conference call to which it was originally invited. Note that from an existing equipment standpoint, the foregoing is substantially transparent, in that the call manager will be instructed just as it would for any meet me conference call, and that only a relatively small amount of functionality would need be added to the multipoint controller. Consequently, the scheme described herein has as one of its benefits substantially compatible backwards compatibility with existing systems.

The foregoing discussion has utilized FIGS. 1–17 to demonstrate a device and process for providing a mechanism to allow more cost efficient conference calls. The following is a more formal and enhanced description of the forgoing-described process.

With reference now to FIGS. 18A, 18B, and FIGS. 1–17, depicted is a high-level logic flowchart illustrating in more detail a process by which a multipoint controller can make more cost-efficient conference calls. Method step 1800 shows the start of the process. Method step 1802 depicts an inquiry as to whether multipoint controller has been notified that terminal A is requesting to add terminal entity C to an ongoing conference call? (e.g., as depicted in FIG. 6 and described in its accompanying text). In the event no such request is received, the process returns to method step 1802.

In the event that a request to add terminal entity C to the ongoing conference call is received, method step 1804 illustrates the initiation of a Multipoint Controller Call Optimization Program (MC-COA) (e.g., as depicted in FIG. 7 and described in its accompanying text). Thereafter, method step 1806 shows that the MC-COA obtains and resolves the connection address for terminal entity C into a non-media-transport-channel-supporting connection address (e.g., such as an Internet Protocol address or Instant Messaging service username such as depicted in FIGS. 7, 8, and 9 and described in their accompanying text). Subsequent to the resolution, method step 1808 shows MC-COA attempts to establish (e.g., via Instant Messaging services in conjunction with usernames such as depicted and/or described herein) COA channel over IP WAN with a Cost Optimization Application Program co-resident with Terminal C (COA-C) (e.g., as depicted in FIG. 10 and described in its accompanying text). Thereafter, method step 1810 shows an inquiry as to whether the COA channel was successfully established. In the event that the inquiry of method step 1810 yields a determination that the COA channel was not successfully established, the process proceeds to method step 1812 which shows that the multipoint controller is informed that the Call Optimization Application is not available. Consequently, thereafter method step 1814 depicts that the multipoint controller resumes normal operations (i.e., multipoint controller 118 initiates call to terminal entity C).

If the inquiry of method step 1810 yields a determination that the COA channel was successfully established, the process proceeds to method step 1816 which illustrations that COA-C gathers "cost," as viewed from COA-C's position within the network (which is the same as the location of terminal entity C which is to be extended an invitation to join the conference call), of the media transport portion of terminal entity C originating a media transport channel with the multipoint processor, and sends that data to MC-COA over COA channel (e.g., as depicted in FIG. 11 and described in its accompanying text). Thereafter, method step 1818 shows that substantially contemporaneously, MC-COA gathers "cost," as viewed from MC-COA's position within the network (which is the same as the position of multipoint controller and processor), of originating a media transport channel from the multipoint controllers position within the network to terminal entity C's position within the network (e.g., as depicted in FIG. 12 and described in its accompanying text).

Method step 1820 depicts that, upon receipt of the cost data from COA-C, MC-COA determines if it would be more cost effective for terminal entity C to originate the media transport channel with the multipoint controller (e.g., as depicted in FIG. 12 and described in its accompanying text). Thereafter, method step 1822 illustrates that MC-COA directs MC-COA token generator to generate a token which contains information indicating that terminal A is extending an invitation to terminal entity C to join the conference call; in addition, if it has been determined that it is more cost effective for terminal entity C to originate the media transport channel with the multipoint controller, the token will contain information indicating that also (e.g., as depicted in FIG. 12 and described in its accompanying text). Thereafter, method step 1824 shows that MC-COA sends token to COA-C (e.g., via Instant Messaging services in conjunction with usernames such as depicted and/or described herein).

Method step 1826 depicts that, upon receipt of the token, COA-C passes the token to COA-C token processor, which decodes the information of the token; COA-C token processor then sends a message to COA-C informing COA-C of that information (e.g., a message that states "a request to join conference call is being extended by terminal A (equates to human user A), and MC-COA has informed us that it is more cost effective for terminal entity C to call establish the media transport channel and has given us a password we can use to join the ongoing conference call once we establish the media transport channel"). An example of the foregoing was described in relation to FIGS. 12 and 13. Method step 1828 illustrates that, subsequent to determining the message contained within the received token, COA-C presents notification (e.g., audio and/or visual in GUI window) to a human user C that human user A has been invited to join the conference call; in addition, if MC-COA has indicated that it is more cost effective for terminal entity C to establish the media transport channel, the notification presents the user with options of joining the call without originating the media transport channel, or of joining the call and originating the media transport channel (e.g., as depicted in relation to FIG. 12 and described in its accompanying text).

Figures 2, 18B:
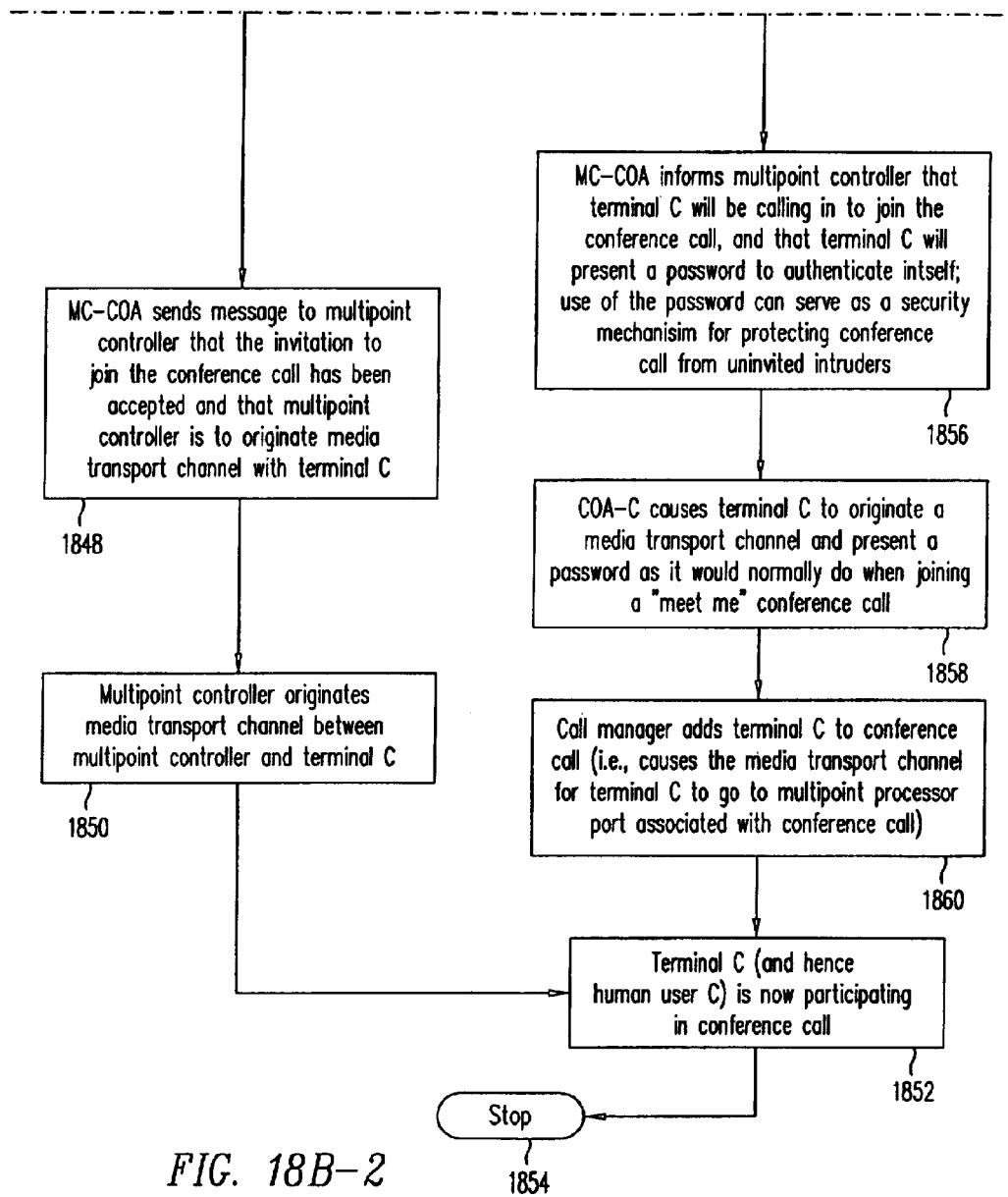

In FIG. 18B, method step 1830 shows an inquiry as to whether COA-C has received input from human user C indicating some response to the displayed invitation to join the conference call?. In the event that the inquiry of method step 1830 show that user input has been received, illustrated is that the process proceeds to method step 1836. In the event that the inquiry of method step 1830 shows that no such input has been received, the process proceeds to method step 1832 which depicts an inquiry as to whether a time-out has occurred. In the event that a time-out has not occurred, the process proceeds to method step 1830 (In an alternate embodiment, the timer is set in the MC-COA for the same purpose.) However, in the event that the inquiry of method step 1832 yields an inquiry that time-out has occurred, the process proceeds to method step 1834 which shows that a response is set "as if" human user C indicated "invitation not accepted." Thereafter, the process proceeds to method step 1836.

Method step 1836 depicts that COA-C instructs COA-C generator to create modified-token indicating human user C's response to the extended invitation options (e.g., as depicted in FIG. 14 and described in its accompanying text). Thereafter, method step 1838 illustrates that the modified-token, which contains the indication of the response of human user C to the invitation to join the conference call is sent to the MC-COA (e.g., as depicted in FIG. 14 and described in its accompanying text).

Method step 1840 shows that, upon receipt of modified-token, MC-COA determines whether the invitation to join conference call has been accepted. Also, in the case where it is found to be more cost effective for user "C" to initiate the call, the modified-token indicates if user "C" has agreed to initiate the call. In the event that the invitation has been accepted, shown is that the process proceeds to method step 1846. In the event that the invitation has not been accepted, the process proceeds to method step 1842 which depicts that MC-COA informs the multipoint controller that the invitation was not accepted. Thereafter, method step 1844 shows that that the conference call proceeds unchanged, and user C is not added to the conference call.

Method step 1846 depicts the inquiry as to whether modified-token indicates that terminal entity C will be originating the media transport channel. In the event that the inquiry depicted in method step 1846 yields a determination that terminal entity C will not be originating the media transport channel, the process proceeds to method step 1848 which illustrates that MC-COA sends message to multipoint controller that the invitation to join the conference call has been accepted and that multipoint controller is to originate media transport channel with terminal entity C (e.g., as depicted in relation to FIG. 15 and described in its accompanying text). Thereafter, method step 1850 shows that the multipoint controller originates media transport channel between multipoint controller and terminal entity C. Subsequently, assuming human user C begins to participate, method step 1852 depicts that Terminal C (and hence human user C) is now participating in conference call (e.g., as depicted in relation to FIG. 18 and described in its accompanying text). Thereafter, the process proceeds to method step 1854 and stops, after human user C has been added to the conference call.

In the event that the inquiry depicted in method step 1846 yields a determination that terminal C will be originating the media transport channel, the process proceeds to method step 1856 which illustrates that MC-COA informs multipoint controller that terminal C has will be calling in to join the conference call, and that terminal C will present a password (which was contained in the invitation token originally token sent to COA-C to authenticate itself (e.g., as depicted in FIGS. 15, 16 and described in their accompanying text); noted in method step 1856 is that such presentation of a password serves as an additional security mechanism in that it provides a vehicle by which the multipoint controller can maintain identity specific control over what terminals can call in and join the ongoing ad-hoc conference call. Thereafter, method step 1858 shows that COA-C causes terminal C to originate a media transport channel into the conference call and presents a password to as it would normally do when joining a "meet me" conference call. Subsequently, method step 1860 depicts that terminal entity C is added to conference call, wherein the call manager connects the media transport channel for terminal entity C to multipoint processor 120, just as it would for any "meet me" conference call (e.g., as depicted in FIGS. 16, 17 and described in their accompanying text). Thereafter, assuming human user C begins to participate, method step 1852 depicts that Terminal C (and hence human user C) is now participating in conference call (e.g., as depicted in FIG. 17 and described in its accompanying text). Subsequently, the process proceeds to method step 1854 and stops, after human user C has been added to the conference call.

OTHER EMBODIMENTS

The preceding discussion has described processes and devices in the context of an ad-hoc conference mode conference call wherein a token is passed. Those having skill in the art will recognize that such token may be passed directly or by reference.

The foregoing discussion has described the process as ending off with the addition of a conference call participant. However, in another embodiment an additional feature is that, at the termination of a media transport channel originated by terminal entity C, the origination costs may be determined and sent to the multipoint controller multipoint controller.

In another embodiment, to prevent fraud, the exchanged tokens, described above, may be encrypted.

In another embodiment, when a MC-COA (e.g., MC-COA 702 as discussed and described above) determines that it is unable to establish a COA channel with its counterpart on another computer system (e.g., COA-C as discussed and described above), the MC-COA sends a message to a multipoint controller that the COA option is not available. In response to such message, the multipoint controller resumes normal processing as it would in the absence of the COA scheme. The foregoing makes the COA scheme substantially backwards compatible with existing systems, since if the COA option is not available, the multipoint controller resumes related-art operations.

In another embodiment, a party inviting another party to a conference call can specify that only ad-hoc mode will be used with respect to the invitee, in response to which the MC-COA will not utilize the call optimization features with respect to the invitee. In yet another embodiment, a party can specify that the only ad-hoc mode will be used for an entire call, in response to which the MC-COA will not utilize the call optimization features with respect to any invitee.

The foregoing detailed description has described various devices and processes. The devices and processes described provide all or part of the following advantages: (a) an IP-based communication channel among endpoints and a multipoint controller to perform call origination negotiation; (b) a mechanism for automatically optimizing the direction of a call in a multipoint call; (c) an optimization policy using 1 or more criteria; (d) backward compatibility with existing systems (existing systems can communicate with the enhanced system described herein without taking advantage of the features presented herein—that is, to existing systems the enhanced system described herein would be substantially transparent); (e) a mechanism for providing a user with information about a prospective multipoint call before he agrees to participate in it; (f) a mechanism for providing the user with information about a prospective multipoint call before he agrees to be charged for participating in it, and (g) a mechanism to settle costs after the call is terminated.

The foregoing detailed description has set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include but are not limited to the following: recordable type media such as floppy disks, hard disk drives, CD ROMs, digital tape, read only memory (ROM), random access memory (RAM) (such as when executable code derived from source code is placed in memory during execution), and transmission type media such as digital and analogue communication links using either synchronous or asynchronous communication links (e.g., TDM, packet, ATM, frame based communications links, or any combination of the foregoing described links).

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims. For example, although AOL Instant Messaging services are described herein, those skilled in the art will recognize that other Instant Messaging services, with only a minimum of experimentation well within the skill of those in the art, can be substituted therefore within the spirit of the description set forth herein.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A method for adding a participant to a conference call, said method comprising:
   in response to a multipoint controller receiving a request to extend an invitation to an ongoing conference call to a first terminal:
      establishing a Call Optimization Application (COA) channel between a Multipoint Controller-Call Optimization Application (MC-COA) and a Call Optimization Application co-resident with the first terminal (Terminal-COA), said establishing a COA channel effected via instant messaging following an address resolution;
   exchanging cost information data between the Terminal-COA and the MC-COA;
   determining an optimal media transport channel origination strategy in response to the cost information data;
   sending the Terminal-COA an invitation to join the conference call, said invitation having associated information consonant with the optimal media transport channel origination strategy;
   receiving, with the MC-COA, a message from the Terminal-COA containing human user input received in response to the invitation to join; and
   responding to the message containing the human user input.

2. The method of claim 1, wherein said establishing a Call Optimization Application (COA) channel further includes:
obtaining a connection address of the terminal to be added; and
associating the connection address with a non-media-transport-channel-supporting connection address, wherein the non-media-transport-channel-supporting connection address includes an instant messaging service identifier.

3. The method of claim 1, wherein said establishing a Call Optimization Application (COA) channel further includes:
establishing an instant messaging connection.

4. The method of claim 1, wherein said exchanging cost information data between the Terminal-COA and the MC-COA further includes:
gathering, with the Terminal-COA, cost information related to the first terminal originating the media transport channel.

5. The method of claim 1, wherein said exchanging cost information data between the Terminal-COA and the MC-COA further includes:
gathering, with the MC-COA, cost information related to the multipoint controller originating the media transport channel.

6. The method of claim 1, wherein said exchanging cost information data between the Terminal-COA and the MC-COA further includes:
sending, over the COA channel, cost information related to the first terminal originating the media transport channel.

7. The method of claim 1, wherein said determining an optimal media transport channel origination strategy in response to the cost information data further includes:
the multipoint controller comparing cost information.

8. The method of claim 1, wherein said sending the Terminal-COA an invitation to join the conference call, said invitation having associated information consonant with the optimal media transport channel origination strategy further includes:
sending a request that the first terminal originate a media transport channel with the multipoint controller, if it has been determined to be most cost effective for the first terminal to originate the media transport channel.

9. The method of claim 1, wherein said sending the Terminal-COA an invitation to join the conference call, said invitation having associated information consonant with the optimal media transport channel origination strategy further includes:
sending a request that the first terminal originate a media transport channel with the multipoint controller, unless specific instructions not to send the request have been received.

10. The method of claim 1, wherein said sending the Terminal-COA an invitation to join the conference call, said invitation having associated information consonant with the optimal media transport channel origination strategy further includes:
sending a token having at least one field selected from the group comprising a token ID field, a conference ID field, a network address field, a password field, a call initiator field, and an other conference call participants' names field.

11. The method of claim 1, wherein said receiving, with the MC-COA, a message from the Terminal-COA containing human user input received in response to the invitation to join further includes:
receiving a message that the human user has rejected the invitation.

12. The method of claim 1, wherein said responding to the message containing the human user input further includes:
sending a message from the MC-COA to the multipoint controller informing the multipoint controller that the invitation to join the conference call has been rejected.

13. The method of claim 1, wherein said receiving, with the MC-COA, a message from the Terminal-COA containing human user input received in response to the invitation to join further includes:
receiving a message that the human user has accepted the invitation to join but has declined a request to initiate a media transport channel.

14. The method of claim 13, wherein said responding to the message containing the human user input further includes:
sending a message from the MC-COA to the multipoint controller informing the multipoint controller that the multipoint controller is to originate a media transport channel with the first terminal, in response to the message that the human user has accepted the invitation to join but has declined a request to initiate a media transport channel.

15. The method of claim 1, wherein said receiving, with the MC-COA, a message from the Terminal-COA containing human user input received in response to the invitation to join further includes:
receiving a message that the human user has accepted the invitation to join and has accepted a request to initiate a media transport channel.

16. The method of claim 15, wherein said responding to the message containing the human user input further includes:
sending a message from the MC-COA to the multipoint controller informing the multipoint controller that the first terminal will be calling in "as if" first terminal were joining a "meet-me" conference call, in response to the message that the human user has accepted the request to initiate the media transport channel.

17. The method of claim 15, wherein said responding to the message containing the human user input further includes:
sending a message from the MC-COA to the multipoint controller informing the multipoint controller that the first terminal will be calling in and authenticating itself with token information, in response to the message that the human user has accepted the request to initiate the media transport channel.

18. The method of claim 17, wherein the token information is unique to the first terminal and provides a security mechanism such that access to the conference call is controlled.

19. The method of claim 15, wherein said responding to the message containing the human user input further includes:
sending a message from the MC-COA to the multipoint controller informing the multipoint controller that the first terminal will be calling in and authenticating itself with token information, and that the first terminal desires to bill the call against another entity, in response to the message that the human user has accepted the request to initiate the media transport channel.

20. A system comprising:
means, responsive to a multipoint controller receiving a request to extend an invitation to an ongoing conference call to a first terminal, for:

establishing a Call Optimization Application (COA) channel between a Multipoint Controller-Call Optimization Application (MC-COA) and a Call Optimization Application co-resident with the first terminal (Terminal-COA), said means for establishing a COA channel effected via instant messaging following an address resolution;

exchanging cost information data between the Terminal-COA and the MC-COA;

determining an optimal media transport channel origination strategy in response to the cost information data;

sending the Terminal-COA an invitation to join the conference call, said invitation having associated information consonant with the optimal media transport channel origination strategy;

receiving, with the MC-COA, a message from the Terminal-COA containing human user input received in response to the invitation to join; and responding to the message containing the human user input.

21. The system of claim 20, further comprising:
a network server computer having the system; and
said network server computer including at least one processor and at least one memory.

22. The system of claim 20, wherein said means for establishing a Call Optimization Application (COA) channel further includes:
means for obtaining a connection address of the terminal to be added; and
means for associating the connection address with a non-media-transport-channel-supporting connection address, wherein the non-media-transport-channel-supporting connection address includes an instant messaging service identifier.

23. The system of claim 20, wherein said means for establishing a Call Optimization Application (COA) channel further includes:
means for establishing an instant messaging connection.

24. The system of claim 20, wherein said means for exchanging cost information data between the Terminal-COA and the MC-COA further includes:
means for gathering, with the Terminal-COA, cost information related to the first terminal originating the media transport channel.

25. The system of claim 20, wherein said means for exchanging cost information data between the Terminal-COA and the MC-COA further includes:
means for gathering, with the MC-COA, cost information related to the multipoint controller originating the media transport channel.

26. The system of claim 20, wherein said means for exchanging cost information data between the Terminal-COA and the MC-COA further includes:
means for sending, over the COA channel, cost information related to the first terminal originating the media transport channel.

27. The system of claim 20, wherein said means for determining an optimal media transport channel origination strategy in response to the cost information data further includes:
means for the multipoint controller to compare cost information.

28. The system of claim 20, wherein said means for sending the Terminal-COA an invitation to join the conference call, said invitation having associated information consonant with the optimal media transport channel origination strategy further includes:
means for sending a request that the first terminal originate a media transport channel with the multipoint controller, if it has been determined to be most cost effective for the first terminal to originate the media transport channel.

29. The system of claim 20, wherein said means for sending the Terminal-COA an invitation to join the conference call, said invitation having associated information consonant with the optimal media transport channel origination strategy further includes:
means for sending a request that the first terminal originate a media transport channel with the multipoint controller, unless specific instructions not to send the request have been received.

30. The system of claim 20, wherein said means for sending the Terminal-COA an invitation to join the conference call, said invitation having associated information consonant with the optimal media transport channel origination strategy further includes:
means for sending a token having at least one field selected from the group comprising a token ID field, a conference ID field, a network address field, a password field, a call initiator field, and an other conference call participants' names field.

31. The system of claim 20, wherein said means for receiving, with the MC-COA, a message from the Terminal-COA containing human user input received in response to the invitation to join further includes:
means for receiving a message that the human user has rejected the invitation.

32. The system of claim 20, wherein said means for responding to the message containing the human user input further includes:
means for sending a message from the MC-COA to the multipoint controller informing the multipoint controller that the invitation to join the conference call has been rejected.

33. The system of claim 20, wherein said means for receiving, with the MC-COA, a message from the Terminal-COA containing human user input received in response to the invitation to join further includes:
means for receiving a message that the human user has accepted the invitation to join but has declined a request to initiate a media transport channel.

34. The system of claim 33, wherein said means for responding to the message containing the human user input further includes:
means for sending a message from the MC-COA to the multipoint controller informing the multipoint controller that the multipoint controller is to originate a media transport channel with the first terminal, in response to the message that the human user has accepted the invitation to join but has declined a request to initiate a media transport channel.

35. The system of claim 20, wherein said means for receiving, with the MC-COA, a message from the Terminal-COA containing human user input received in response to the invitation to join further includes:
means for receiving a message that the human user has accepted the invitation to join and has accepted a request to initiate a media transport channel.

36. The system of claim 35, wherein said means for responding to the message containing the human user input further includes:

means for sending a message from the MC-COA to the multipoint controller informing the multipoint controller that the first terminal will be calling in "as if" first terminal were joining a "meet-me" conference call, in response to the message that the human user has accepted the request to initiate the media transport channel.

37. The system of claim 35, wherein said means for responding to the message containing the human user input further includes:
means for sending a message from the MC-COA to the multipoint controller informing the multipoint controller that the first terminal will be calling in and authenticating itself with token information, in response to the message that the human user has accepted the request to initiate the media transport channel.

38. The system of claim 35, wherein the token information is unique to the first terminal and provides a security mechanism such that access to the conference call is controlled.

39. The system of claim 35, wherein said means for responding to the message containing the human user input further includes:
means for sending a message from the MC-COA to the multipoint controller informing the multipoint controller that the first terminal will be calling in and authenticating itself with token information, and that the first terminal desires to bill the call against another entity, in response to the message that the human user has accepted the request to initiate the media transport channel.

40. A method for adding a participant to a conference call, said method comprising:
in response to a multipoint controller receiving a request to extend an invitation to an ongoing conference call to a first terminal, attempting to establish, via instant messaging services, a Call Optimization Application (COA) channel between a Multipoint Controller-Call Optimization Application (MC-COA) and a Call Optimization Application co-resident with the first terminal (Terminal-COA).

41. The method of claim 40, wherein said attempting to establish, via instant messaging services, a Call Optimization Application (COA) channel further comprises:
determining that the COA channel cannot be established; and
informing the multipoint controller that Call Optimization is unavailable, whereby substantially backwards compatibility with existing communications systems is achieved.

42. A system comprising:
means for detecting reception of a request to extend an invitation to an ongoing conference call to a first terminal; and
means for attempting to establish, via instant messaging services, a Call Optimization Application (COA) channel between a Multipoint Controller-Call Optimization Application (MC-COA) and a Call Optimization Application co-resident with the first terminal (Terminal-COA).

43. The system of claim 42, further comprising:
a network server computer having the system; and
said network server computer including at least one processor and at least one memory.

44. The system of claim 42, wherein said means for attempting to establish, via instant messaging services, a Call Optimization Application (COA) channel further comprises:
means for determining that the COA channel cannot be established; and
means for informing the multipoint controller that Call Optimization is unavailable, whereby substantially backwards compatibility with existing communications systems is achieved.

45. A method for accepting an invitation to an ongoing conference call, said method comprising:
receiving, with a Call Optimization Application co-resident with a first terminal (Terminal-COA), an invitation to the first terminal to join an ongoing conference call over a Call Optimization Application (COA) channel established via instant messaging services; and
responding to the invitation to join in response to human user input to an interface activated in response to the invitation.

46. The method of claim 45, wherein said receiving, with a Call Optimization Application co-resident with a first terminal (Terminal-COA), an invitation to the first terminal to join an ongoing conference call over a Call Optimization Application (COA) channel established via instant messaging services further includes:
receiving a token having at least one field selected from the group comprising a token ID field, a conference ID field, a network address field, a password field, a call initiator field, and an other conference call participants' names field.

47. The method of claim 45, wherein said receiving, with a Call Optimization Application co-resident with a first terminal (Terminal-COA), an invitation to the first terminal to join an ongoing conference call over a Call Optimization Application (COA) channel established via instant messaging services further includes:
gathering cost information related to the first terminal originating a media transport channel with a multipoint controller; and
sending a message containing the cost information from the Terminal-COA to a Multipoint-Controller Call Optimization Application (MC-COA) over the COA channel.

48. The method of claim 45, wherein said responding to the invitation to join in response to human user input to an interface activated in response to the invitation further includes:
sending a message containing the human user input from the Terminal-COA to a Multipoint-Controller Call Optimization Application (MC-COA) over the COA channel.

49. The method of claim 45, wherein said responding to the invitation to join in response to human user input to an interface activated in response to the invitation further includes:
activating an interface which presents at least one invitation option selected from the group comprising accepting or rejecting an invitation to join an ongoing conference call, accepting the invitation to join the ongoing conference call but rejecting an invitation to originate a media transport channel, and accepting the invitation to join the ongoing conference call and accepting the invitation to originate the media transport channel.

50. The method of claim 45, wherein said responding to the invitation to join in response to human user input to an interface activated in response to the invitation further includes:
  sending a message indicative of the human user input from the Terminal-COA to a Multipoint Controller-Call Optimization Application (MC-COA) over the COA channel.

51. The method of claim 45, wherein said responding to the invitation to join in response to human user input to an interface activated in response to the invitation further includes:
  causing, with the Terminal-COA, the first terminal to originate a media transport channel with a multipoint controller and authenticate itself as if it were a "meet-me" conference call, in response to user input indicating that an invitation to join an ongoing conference call has been accepted and that a request that the first terminal originate the media transport channel has been accepted.

52. The method of claim 51, further comprising:
  the first terminal authenticating itself by presenting token information, received by the Terminal-COA from the MC-COA, to the multipoint controller.

53. A system comprising:
  means for receiving, with a Call Optimization Application co-resident with a first terminal (Terminal-COA), an invitation to the first terminal to join an ongoing conference call over a Call Optimization Application (COA) channel established via instant messaging services; and
  means for responding to the invitation to join in response to human user input to an interface activated in response to the invitation.

54. The system of claim 53, further comprising:
  a workstation computer having the system; and
  said workstation computer having at least one processor and at least one memory.

55. The system of claim 53, wherein said means for receiving, with a Call Optimization Application co-resident with a first terminal (Terminal-COA), an invitation to the first terminal to join an ongoing conference call over a Call Optimization Application (COA) channel established via instant messaging services further includes:
  means for receiving a token having at least one field selected from the group comprising a token ID field, a conference ID field, a network address field, a password field, a call initiator field, and an other conference call participants' names field.

56. The system of claim 53, wherein said means for receiving, with a Call Optimization Application co-resident with a first terminal (Terminal-COA), an invitation to the first terminal to join an ongoing conference call over a Call Optimization Application (COA) channel established via instant messaging services further includes:
  means for gathering cost information related to the first terminal originating a media transport channel with a multipoint controller; and
  means for sending a message containing the cost information from the Terminal-COA to a Multipoint-Controller Call Optimization Application (MC-COA) over the COA channel.

57. The system of claim 53, wherein said means for responding to the invitation to join in response to human user input to an interface activated in response to the invitation further includes:
  means for sending a message containing the human user input from the Terminal-COA to a Multipoint-Controller Call Optimization Application (MC-COA) over the COA channel.

58. The system of claim 53, wherein said means for responding to the invitation to join in response to human user input to an interface activated in response to the invitation further includes:
  means for activating an interface which presents at least one invitation option selected from the group comprising accepting or rejecting an invitation to join an ongoing conference call, accepting the invitation to join the ongoing conference call but rejecting an invitation to originate a media transport channel, and accepting the invitation to join the ongoing conference call and accepting the invitation to originate the media transport channel.

59. The system of claim 53, wherein said means for responding to the invitation to join in response to human user input to an interface activated in response to the invitation further includes:
  means for sending a message indicative of the human user input from the Terminal-COA to a Multipoint Controller-Call Optimization Application (MC-COA) over the COA channel.

60. The system of claim 53, wherein said means for responding to the invitation to join in response to human user input to an interface activated in response to the invitation further includes:
  means for causing, with the Terminal-COA, the first terminal to originate a media transport channel with a multipoint controller and authenticate itself as if it were a "meet-me" conference call, in response to user input indicating that an invitation to join an ongoing conference call has been accepted and that a request that the first terminal originate the media transport channel has been accepted.

61. The system of claim 60, further comprising:
  means for the first terminal to authenticate itself by presenting token information, received by the Terminal-COA from the MC-COA, to the multipoint controller.

62. A program product comprising:
  signal bearing media bearing program code, responsive to a multipoint controller receiving a request to extend an invitation to an ongoing conference call to a first terminal, for:
    establishing a Call Optimization Application (COA) channel between a Multipoint Controller-Call Optimization Application (MC-COA) and a Call Optimization Application co-resident with the first terminal (Terminal-COA) following an address resolution), said establishing a COA channel effected via instant messaging;
    exchanging cost information data between the Terminal-COA and the MC-COA;
    determining an optimal media transport channel origination strategy in response to the cost information data;
    sending the Terminal-COA an invitation to join the conference call, said invitation having associated information consonant with the optimal media transport channel origination strategy;
    receiving, with the MC-COA, a message from the Terminal-COA containing human user input received in response to the invitation to join; and responding to the message containing the human user input.

63. The program product of claim 62, wherein said signal bearing media further includes recordable media.

64. The program product of claim 62, wherein said signal bearing media further includes transmission media.

65. A program product comprising:
signal bearing media bearing program code, responsive to a multipoint controller receiving a request to extend an invitation to an ongoing conference call to a first terminal, for attempting to establish, via instant messaging services, a Call Optimization Application (COA) channel between a Multipoint Controller-Call Optimization Application (MC-COA) and a Call Optimization Application co-resident with the first terminal (Terminal-COA)).

66. The program product of claim 65, wherein said signal bearing media is selected from the group comprising recordable media and transmission media.

67. A program product comprising:
signal bearing media bearing
program code for receiving, with a Call Optimization Application co-resident with a first terminal (Terminal-COA), an invitation to the first terminal to join an ongoing conference call over a Call Optimization Application (COA) channel) established via instant messaging services; and
program code for responding to the invitation to join in response to human user input to an interface activated in response to the invitation.

68. The program product of claim 67, wherein said signal bearing media further includes:
said signal bearing media selected from the group comprising recordable media and transmission media.

69. The method of claim 10, wherein said network address field of said token comprises an instant messaging services username.

70. The system of claim 30, wherein said network address field of said token comprises an instant messaging services username.

71. The method of claim 46, wherein
said network address field of said token comprises an instant messaging services username,
the instant messaging services username identifies a computer, and
a multipoint controller resides on the computer.

72. The system of claim 55, wherein
said network address field of said token comprises an instant messaging services username,
the instant messaging services username identifies a computer, and
a multipoint controller resides on the computer.

73. A system comprising:
a call manager, wherein
the call manager is configured to detect a request to add a terminal entity to an ongoing conference call, and
a multipoint controller call optimization application (MC-COA) coupled to the call manager, wherein
the MC-COA is configured to initiate a call optimization channel (COA) to the terminal entity via instant messaging services, in response to detection of the request.

74. The system of claim 73, wherein the MC-COA is configured to:
establish, via the instant messaging services, the COA channel between the MC-COA and a Call Optimization Application co-resident with the terminal entity following an address resolution;
exchange cost information data with the terminal entity;
determine an optimal media transport channel origination strategy in response to the cost information data;
send the terminal entity an invitation to join the conference call, the invitation having associated information consonant with the optimal media transport channel origination strategy;
receive a message from the terminal entity containing human user input received in response to the invitation to join; and
respond to the message containing the human user input.

75. The system of claim 74, wherein the MC-COA is configured to:
obtain a connection address of the terminal entity to be added to the ongoing conference call,
associate the connection address with a non-media-transport-channel- supporting connection address.

76. The system of claim 74, wherein the MC-COA is configured to:
gather cost information related to the first terminal originating a media transport channel,
gather cost information related to the multipoint controller originating the media transport channel, and
send a request that the terminal entity originate the media transport channel, if it has been determined to be most cost effective for the terminal entity to originate the media transport channel.

77. The system of claim 74, wherein
the MC-CQA is configured to send the terminal entity a token having at least one field selected from the group comprising a token ID field, a conference ID field, a network address field, a password field, a call initiator field, and an other conference call participants' names field.

78. The system of claim 77, wherein
the network address field of the token comprises an instant messaging services username.

79. The system of claim 77, wherein
the message from the terminal entity comprises information indicating that the human user has accepted the invitation to join and has accepted a request to initiate a media transport channel.

80. The system of claim 79, wherein
the MC-COA is configured to send a message to a multipoint controller, the message informing the multipoint controller that the terminal entity will be calling in "as if" first terminal were joining a "meet me" conference call.

81. The system of claim 79, wherein
the MC-COA is configured to send a message to a multipoint controller, the message informing the multipoint controller that the terminal entity will be calling in and authenticating itself with token information, wherein
the token information is unique to the terminal entity and provides a security mechanism such that access to the ongoing conference call is controlled.

82. A system comprising:
a terminal entity, wherein
the terminal entity is configured to receive, via a Call Optimization Application (COA) channel established via instant messaging services, an invitation for the terminal entity to join an ongoing conference call; and
a Call Optimization Application co-resident with the terminal entity, wherein
the Call Optimization Application is configured to respond to the invitation to join, in response to human user input to an interface activated in response to the invitation.

83. The system of claim 82, wherein
the terminal entity is configured to receive a token having at least one field selected from the group comprising a token ID field, a conference ID field, a network address field, a password field, a call initiator field, and an other conference call participants' names field.

84. The system of claim 83, wherein
the network address field of the token comprises an instant messaging services username.

85. The system of claim 82, wherein
the Call Optimization Application is configured to gather cost information related to the terminal entity originating a media transport channel with a multipoint controller; and
the terminal entity is configured to send a message containing the cost information to a Multipoint-Controller Call Optimization Application (MC-COA) over the OQA channel.

86. The system of claim 85, wherein
the terminal entity is configured to send a message containing the human user input to the Multipoint-Controller Call Optimization Application (MC-COA) over the COA channel.

87. The system of claim 86, wherein
the Call Optimization Application is configured to cause the terminal entity to originate a media transport channel with the multipoint controller and authenticate the terminal entity as if the ongoing conference call were a "meet-me" conference call, in response to user input indicating that an invitation to join the ongoing conference call has been accepted and that a request that the terminal entity originate the media transport channel has been accepted.

88. The system of claim 87, wherein
the terminal entity is configured to authenticate itself by presenting token information, received from the MC-COA, to the multipoint controller.

* * * * *